US010440742B2

(12) United States Patent
Sun et al.

(10) Patent No.: US 10,440,742 B2
(45) Date of Patent: Oct. 8, 2019

(54) DYNAMIC GRANT-FREE AND GRANT-BASED UPLINK TRANSMISSIONS

(71) Applicant: QUALCOMM Incorporated, San Diego, CA (US)

(72) Inventors: Haitong Sun, San Diego, CA (US); Jay Kumar Sundararajan, San Diego, CA (US); Joseph Binamira Soriaga, San Diego, CA (US); Wanshi Chen, San Diego, CA (US); Peter Gaal, San Diego, CA (US); Hao Xu, San Diego, CA (US); Tingfang Ji, San Diego, CA (US); Wei Zeng, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 89 days.

(21) Appl. No.: 15/462,669

(22) Filed: Mar. 17, 2017

(65) Prior Publication Data

US 2018/0092125 A1 Mar. 29, 2018

Related U.S. Application Data

(60) Provisional application No. 62/399,148, filed on Sep. 23, 2016.

(51) Int. Cl.
*H04W 74/02* (2009.01)
*H04W 72/12* (2009.01)
(Continued)

(52) U.S. Cl.
CPC ........ *H04W 74/02* (2013.01); *H04W 72/0413* (2013.01); *H04W 72/1294* (2013.01); *H04W 74/004* (2013.01)

(58) Field of Classification Search
CPC ............... H04W 74/02; H04W 74/004; H04W 74/00–0891
See application file for complete search history.

(56) References Cited

U.S. PATENT DOCUMENTS 6,529,520 B1 * 3/2003 Lee ..................... H04L 12/2801
370/442
2009/0103558 A1 4/2009 Zangi et al.
(Continued)

OTHER PUBLICATIONS

NTT Docomo., et al., "Uplink Multiple Access Schemes for NR", 3GPP Draft; R1-165174 Contention-Based UT Transmission, 3rd Generation Partnership Project (3GPP), Mobile Competence Centre; 650, Route Des Lucioles; F-06921, Sophia-Antipolis Cedex, France, vol. RAN WG1, No. Nanjing, China, May 23, 2016-May 27, 2016 May 14, 2016 (May 14, 2016), 4 pages, XP051096229, Retrieved from the Internet: URL: http://www.3gpp.org/ftp/tsg_ran/WG1_RL1/TSGR1_85/Docs/ [retrieved on May 14, 2016].
(Continued)

*Primary Examiner* — Warner Wong
(74) *Attorney, Agent, or Firm* — Haynes and Boone, LLP

(57) ABSTRACT

Wireless communications systems and methods related to performing hybrid grant-free and grant-based uplink (UL) data transmission. A wireless communication device dynamically selects between a grant-free mode and a grant-based mode based on at least a transmission configuration. The wireless communication device sends a first data packet in the grant-free mode, based on the selecting, using a first UL resource. The wireless communication device sends a second data packet in the grant-based mode, based on the selecting, using a second UL resource allocated to the wireless communication device. Other aspects, embodiments, and features are also claimed and described.

30 Claims, 11 Drawing Sheets

(51) Int. Cl.
*H04W 72/04* (2009.01)
*H04W 74/00* (2009.01)

(56) References Cited

U.S. PATENT DOCUMENTS

| | | | |
|---|---|---|---|
| 2010/0014423 A1 | 1/2010 | Furuskar et al. | |
| 2015/0334642 A1* | 11/2015 | Maaref | H04W 48/18 370/329 |
| 2015/0334643 A1* | 11/2015 | Maaref | H04W 48/18 370/329 |
| 2016/0100430 A1* | 4/2016 | Dabeer | H04W 28/0278 370/329 |
| 2016/0255642 A1 | 9/2016 | Malik et al. | |
| 2017/0257195 A1* | 9/2017 | Maaref | H04L 1/0057 |
| 2017/0318598 A1* | 11/2017 | Islam | H04W 72/04 |
| 2018/0035458 A1* | 2/2018 | Islam | H04L 1/16 |
| 2018/0035459 A1* | 2/2018 | Islam | H04L 1/16 |
| 2018/0070335 A1* | 3/2018 | Amuru | H04L 5/0044 |
| 2018/0070341 A1* | 3/2018 | Islam | H04L 5/0064 |
| 2018/0083758 A1 | 3/2018 | Islam et al. | |
| 2018/0084430 A1* | 3/2018 | Patel | H04W 74/08 |
| 2018/0124598 A1* | 5/2018 | Zeng | H04L 63/0428 |
| 2018/0124813 A1* | 5/2018 | Li | H04W 72/0446 |
| 2018/0139724 A1 | 5/2018 | Loehr et al. | |
| 2018/0176945 A1* | 6/2018 | Cao | H04W 72/1268 |
| 2018/0248645 A1* | 8/2018 | Bayesteh | H04L 1/0001 |
| 2019/0007324 A1* | 1/2019 | Sebire | H04W 28/02 |
| 2019/0174472 A1* | 6/2019 | Lee | H04L 1/1812 |
| 2019/0200352 A1* | 6/2019 | Hosseini | H04L 1/1812 |

OTHER PUBLICATIONS

Interdigital Communications., "Discussion on Multiple Access for New Radio Systems", 3GPP Draft; R1-162922 Discussion on Multiple Access for New Radio Systems, 3rd Generation Partnership Project (3GPP), Mobile Competence Centre; 650, Route Des Lucioles; F-06921 Sophia-Antipolis Cedex, vol. RAN WG1, No. Busan, Korea; Apr 11, 2016-Apr. 15, 2016 Apr. 1, 2016 (Apr. 1, 2016), 4 pages, XP051079857, Retrieved from the Internet: URL: http://www.3gpp.org/ftp/tsg_ran/WG 1_RL 1 /TSG R 1_84b/Docs/ [retrieved on Apr. 1, 2016].

International Search Report and Written Opinion—PCT/US2017/046115—ISA/EPO—dated Nov. 6, 2017.

* cited by examiner

DYNAMIC GRANT-FREE AND GRANT-BASED UPLINK TRANSMISSIONS

CROSS REFERENCE TO RELATED APPLICATIONS

The present application claims priority to and the benefit of the U.S. Provisional Patent Application No. 62/399,148, filed Sep. 23, 2016, which is hereby incorporated by reference in its entirety as if fully set forth below and for all applicable purposes.

TECHNICAL FIELD

The technology discussed in this disclosure relates generally to wireless communication systems, and more particularly to improving system efficiency by allowing uplink (UL) transmissions in grant-free and grant-based modes. Embodiments can enable and provide network communication components capable of operating in hybrid communication modes enabling better device performance, user improvement, and overall network communication throughput.

INTRODUCTION

A wireless communication network may include a number of base stations (BSs) that can support communication for a number of user equipment devices (UEs). In recent years, the developments of electronic, information, sensing, and application technologies cause the Internet to evolve from a human-oriented network, where a person creates and consumes information, into the Internet of Things (IoT), where distributed elements exchange and process information.

Demands for serving IoT type wireless data traffic is increasing and network interaction with IoT devices is also rising. As one example, smart wireless meters and wireless sensors may be installed throughout buildings in various areas. Smart meters may send meter readings to utilities at some time periods, for example, hourly, daily, or weekly. Sensors may send sensing measurements to servers at some time periods, which may be based on sensing events. Having more and more IoT devices of various types also alters how these devices transmit data in wireless communication scenarios.

In current wireless networks, UL transmissions are grant-based. In this model, BSs may dynamically allocate resources to UEs for UL transmissions. UL refers to the transmission direction from the UEs to a BS. For example, a UE sends a scheduling request to a BS and the BS responds by sending a UL grant indicating a resource allocated to the UE. Subsequently, the UE sends the data on the allocated resource. The signaling resource overhead associated with the transmission of the scheduling request and the UL grant may be significant when the size of the transmitted data is small. The signaling can also cause delays for data transmission even when resources are available. Reducing signaling overheads may benefit applications, such as IoT, ultra-reliable, low-latency communication (URLLC), and massive machine type communication (mMTC), that require small-size packet transmissions.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Embodiments of the present disclosure provide hybrid grant-free and grant-based transmission mechanisms for improving network or system efficiency. A network may dynamically switch between allowing for grant-free UL transmissions and disallowing for grant-free UL transmissions based on network loadings or conditions. A UE may dynamically and selectively request for grant-free or grant-based UL transmissions based on network configurations, measurements, and application or transmission requirements. Grant-free transmissions have low signaling overhead, and thus may be suitable for small-size packet transmissions, for example, when the packet size is less than about 32 bytes or when the signaling overhead to packet size ratio is more than about 20 percent (%).

For example, in an aspect of the disclosure, a method of wireless communication, includes selecting, dynamically by a user equipment (UE), between a grant-free mode and a grant-based mode based on at least a transmission configuration; sending, by the UE based on the selecting, a first data packet in the grant-free mode using a first uplink (UL) resource; and sending, by the UE based on the selecting, a second data packet in the grant-based mode using a second UL resource allocated to the UE.

In an additional aspect of the disclosure, a method of wireless communication includes determining, dynamically by a first wireless communication device, whether to allow uplink (UL) data transmission in a grant-free mode in a network; sending, by the first wireless communication device, a first configuration message indicating that the grant-free mode is allowed in the network when determining that the grant-free mode is allowed; receiving, by the first wireless communication device from a second wireless communication device, a first data packet in the grant-free mode from a first UL resource; and receiving, by the first wireless communication device from the second wireless communication device, a second data packet in a grant-based mode from a second UL resource allocated to the second wireless communication device.

In an additional aspect of the disclosure, a wireless communication device includes a processor configured to dynamically select between a grant-free mode and a grant-based mode based on at least a transmission configuration; and a transmitter configured to send, based on the selecting, a first data packet in the grant-free mode using a first uplink (UL) resource; and send, based on the selecting, a second data packet in the grant-based mode using a second UL resource allocated to the wireless communication device.

In an additional aspect of the disclosure, an apparatus includes a processor configured to dynamically determine whether to allow uplink (UL) data transmission in a grant-free mode in a network; a transmitter configured to send a first configuration message indicating that the grant-free mode is allowed in the network when determining that the grant-free mode is allowed; and a receiver configured to receive, from a wireless communication device, a first data packet in the grant-free mode from a first UL resource; and receive, from the wireless communication device, a second data packet in a grant-based mode from a second UL resource allocated to the wireless communication device.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
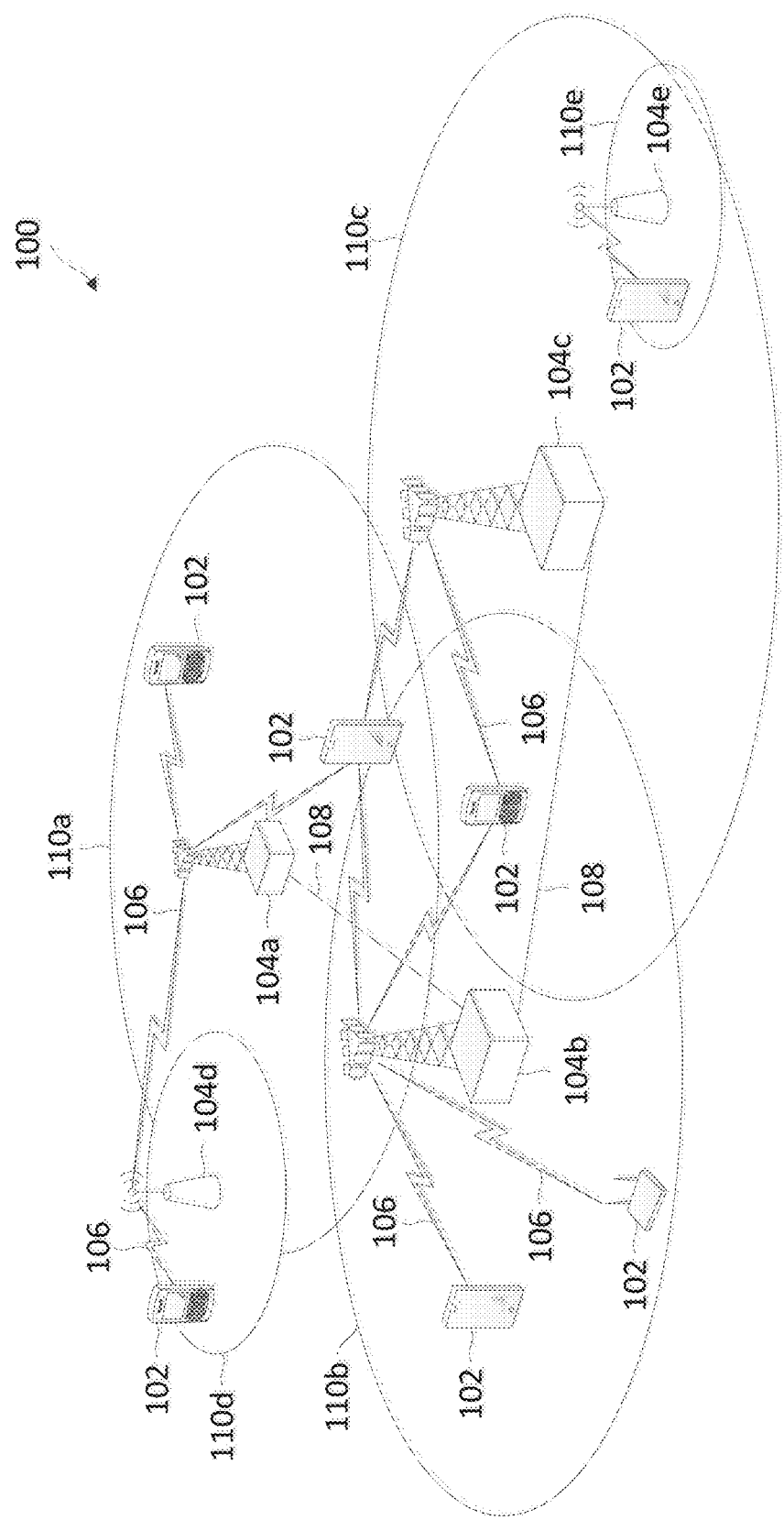
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G)) network.

Although grant-based or scheduling mechanisms can be inefficient for small packet transmissions, grant-based or scheduling mechanisms provide several benefits. Small packets may refer to packets with a packet size less than about 32 bytes or with signaling overhead to packet size ratio of more than about 20%. For example, grant-based transmissions are orthogonal, and thus receiver processing can be simplified. In addition, grant-based transmissions allow for link adaptation, and thus may improve link efficiency. Further, grant-based transmissions allow for interference control, and thus may improve system stability.

One approach to reducing signaling overheads is to allow for grant-free UL transmissions. According to this approach, a UE may randomly select a resource and transmit UL data on the randomly selected resource. The grant-free approach may require non-orthogonal transmission, and thus advanced processing may be required at the receiver to recover capacity. Link adaptation and interference control may be more complex or difficult to apply in the grant-free approach. So in some scenarios link efficiency and system stability may be lower than the grant-based approach. In addition, the near-far problem associated with UEs located near and far from a BS sending grant-free UL data simultaneously may impact system coverage.

The present disclosure describes hybrid grant-free and grant-based mechanisms for improving network or system efficiency. In some disclosed embodiments, a BS may dynamically configure a network to switch between allowing for grant-free UL transmissions and disallowing for grant-free UL transmissions to optimize system efficiency based on network conditions. A UE may dynamically and selectively request and perform grant-free or grant-based UL transmissions based on network configurations, measurements, and application or transmission requirements. For example, in an embodiment, a BS may configure rules for grant-free UL transmission to limit the UEs that are allowed to operate in the grant-free mode. In some embodiments, a BS may pre-configure a subset of the resource for grant-free UL transmissions. Thus, BSs and UEs may operate together to take advantage of the grant-free mode and minimize the adverse effects of the grant-free mode. Some disclosed embodiments are suitable for use in any wireless networks operating in frequency-division duplexing (FDD) or time-division duplexing (TDD) modes. In addition, some disclosed embodiments may improve delivery efficiency for applications, such as URLLC, IoT, and mMTC, that may utilize or operate with small-packet transmissions. Further, some disclosed embodiments may be suitable for use in high-mobility applications, such as vehicles and drones.

FIG. 1 illustrates a wireless communication network 100 according to embodiments of the present disclosure. The network 100 may be a cellular wireless network or a non-cellular wireless network. The network 100 may include a number of UEs 102, as well as a number of BSs 104. The BSs 104 may include an Evolve Node B (eNodeB). A BS 104 may be a station that communicates with the UEs 102 and may also be referred to as a base transceiver station, a node B, an access point, and the like.

The BSs 104 communicate with the UEs 102 as indicated by communication signals 106. A UE 102 may communicate with the BS 104 via an uplink (UL) and a downlink (DL). The downlink (or forward link) refers to the communication link from the BS 104 to the UE 102. The UL (or reverse link) refers to the communication link from the UE 102 to the BS 104. The BSs 104 may also communicate with one another, directly or indirectly, over wired and/or wireless connections, as indicated by communication signals 108.

The UEs 102 may be dispersed throughout the network 100, as shown, and each UE 102 may be stationary or mobile. The UE 102 may also be referred to as a terminal, a mobile station, a subscriber unit, etc. The UE 102 may be a cellular phone, a smartphone, a personal digital assistant, a wireless modem, a laptop computer, a tablet computer, an in-vehicle communication device, a device-to-device (D2D) communication device, etc. The network 100 is one example of a network to which various aspects of the disclosure apply.

Each BS 104 may provide communication coverage for a particular geographic area. In 3GPP, the term "cell" can refer to this particular geographic coverage area of a BS and/or a BS subsystem serving the coverage area, depending on the context in which the term is used. In this regard, a BS 104 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS.

In the example shown in FIG. 1, the BSs 104a, 104b and 104c are examples of macro BSs for the coverage areas 110a, 110b and 110c, respectively. The BSs 104d and 104e are examples of pico and/or femto BSs for the coverage areas 110d and 110e, respectively. As will be recognized, a BS 104 may support one or multiple (e.g., two, three, four, and the like) cells.

The network 100 may also include relay stations. A relay station is a station that receives a transmission of data and/or other information from an upstream station (e.g., a BS, a UE, or the like) and sends a transmission of the data and/or other information to a downstream station (e.g., another UE, another BS, or the like). A relay station may also be a UE that relays transmissions for other UEs. A relay station may also be referred to as a relay BS, a relay UE, a relay, and the like.

The network 100 may support synchronous or asynchronous operation. For synchronous operation, the BSs 104 may have similar frame timing, and transmissions from different BSs 104 may be approximately aligned in time. For asynchronous operation, the BSs 104 may have different frame timing, and transmissions from different BSs 104 may not be aligned in time.

In some implementations, the network 100 utilizes orthogonal frequency division multiplexing (OFDM) on the downlink and single-carrier frequency division multiplexing (SC-FDM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In an embodiment, the network 100 can be a LTE network. In such an embodiment, the BSs 104 can assign or schedule transmission resources (e.g., in the form of time-frequency resource blocks) for DL and UL transmissions in the network 100. The communication can be in the form of radio frames. A radio frame may be divided into a plurality of subframes. In a FDD mode, simultaneous UL and DL transmissions may occur in different frequency bands. In a TDD mode, UL and DL transmissions occur at different time periods using the same frequency band. For example, a subset of the subframes in a radio frame may be used for DL transmissions and another subset of the subframes may be used for UL transmissions. The DL and UL subframes can be shared among the BSs 104 and the UEs 102, respectively. The DL subframes and the UL subframes can be further divided into several regions. For example, each DL or UL subframe may have pre-defined regions for transmissions of reference signals, control information, and data. Reference signals are pre-determined signals that facilitate the communications between the BSs 104 and the UEs 102. For example, a reference signal can have a particular pilot pattern or structure, where pilot tones may span across an operational bandwidth or frequency band, each positioned at a pre-defined time and a pre-defined frequency. Control information may include resource assignments and protocol controls. Data may include protocol data and/or operational data.

In an embodiment, the BSs 104 can broadcast system information associated with the network 100. Some examples of system information may include physical layer information such as cell bandwidths and frame configurations, cell access information, and neighbor cell information. A UE 102 can access the network 100 by listening to broadcast system information and requesting connection or channel establishments with a BS 104. For example, the UE 102 can perform a random access procedure to begin communication with the BS 104 and subsequently may perform connection and/or registration procedures to register with the BS 104. After completing the connection and/or the registration, the UE 102 and the BS 104 can enter a 'normal' operation stage, where operational data may be exchanged. The BS 104 may assign a UE identifier (ID) to the UE 102 for identifying the UE 102 in the network 100. Data exchange between the BS 104 and the UE 102 during the normal operation may be based on the assigned UE ID.

The UE 102 may operate in a radio resource control (RRC) inactive state or a RRC dedicated state after entering the normal operation stage. In the RRC inactive state, the UE 102 is in an idle mode and not be actively communicating with the BS 104. However, information associated with the UE 102 (e.g., the UE ID) is saved in the network 100. For example, the UE 102 may enter the idle mode to save power. While in idle mode, the UE 102 may monitor a paging channel for incoming data and may wake up upon detection of incoming data. In the RRC dedicated state, the UE 102 actively monitors control information in DL subframes to determine whether the DL subframes have DL data scheduled for the UE 102, for example, based on the UE ID. When the UE 102 has UL data to send, the UE 102 sends a scheduling request to the BS 104. The BS 104 responds by sending a UL grant indicating a UL resource allocated to the UE. The UL grant may be carried in control information of a DL subframe and the UL resource may be in a subsequent UL subframe. Subsequently, the UE 102 sends UL data on the allocated UL resource. The size of the UL data may vary depending on the application in use. The signaling overhead can be significant when the UL data size is small. Thus, the signaling overhead may impact packet delivery efficiency for applications with small data packets, for example, having less than about 32 bytes.

Figure 2:
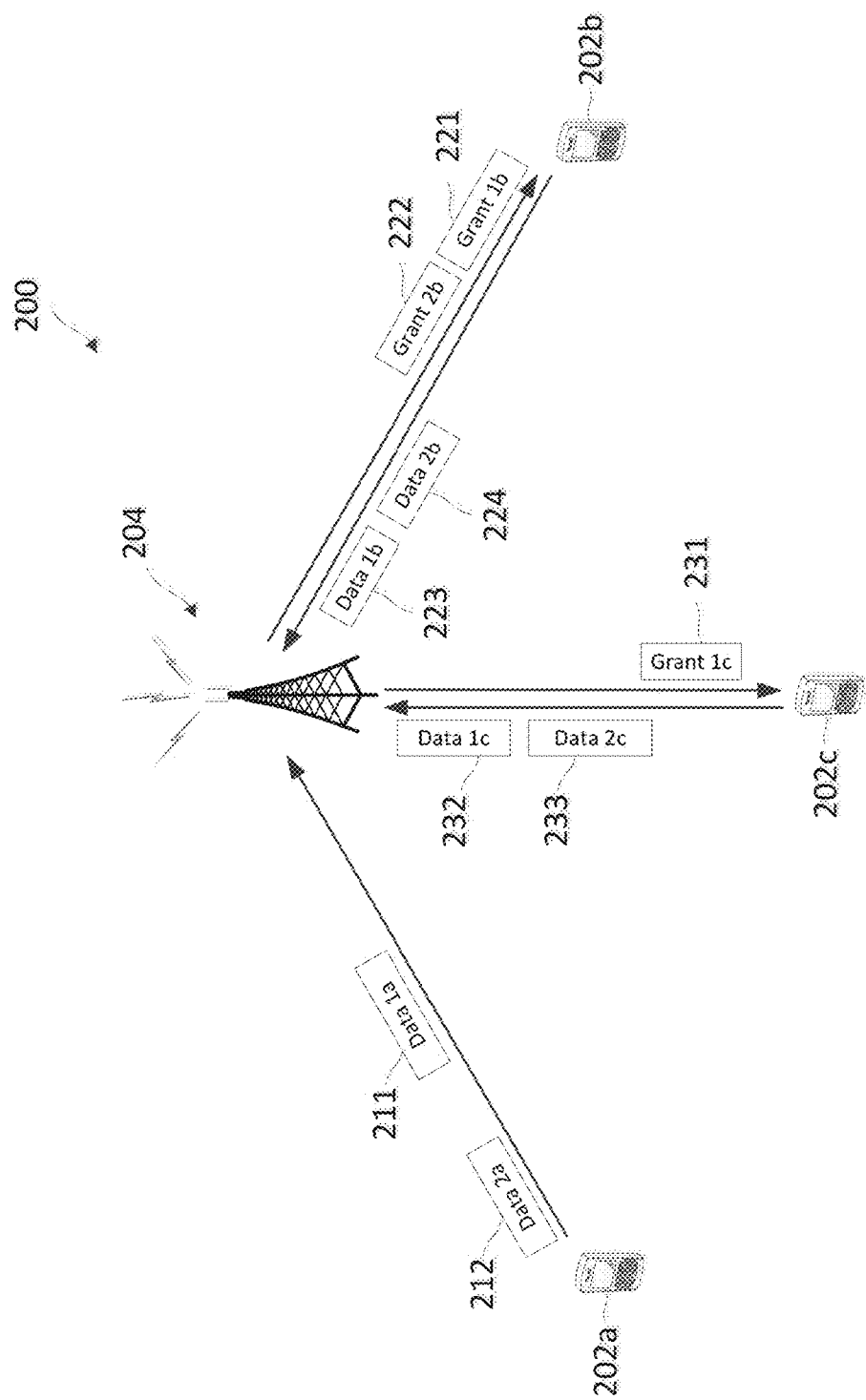
FIG. 2 illustrates a wireless communication network that implements hybrid grant-free and grant-based UL transmissions according to embodiments of the present disclosure.

FIG. 2 illustrates a wireless communication network 200 that implements hybrid grant-free and grant-based UL transmissions according to embodiments of the present disclosure. FIG. 2 illustrates one BS 204 and three UEs 202 for purposes of simplicity of discussion, though it will be recognized that embodiments of the present disclosure may scale to many more UEs 202 and/or BSs 204. The BS 204 and the UEs may be substantially similar to the BSs 104. The UEs 202 may be substantially similar to the UEs 102. The UEs 202 and the BS 204 may communicate with each other at any suitable frequencies.

In the network 200, the UEs 202 may send UL data packets to the BS 204 in a grant-based mode and/or a grant-free mode while operating in a RRC inactive state or a RRC dedicated state. As shown, the UE 202*a* sends UL data packets 211 (e.g., Data 1*a*) and 212 (e.g., Data 2*a*) to the BS 204 in the grant-free mode without receiving UL grants from the BS 204. In contrast, the UE 202*b* sends UL data packets 223 and 224 to the BS 204 in the grant-based mode. For example, the BS 204 sends UL grants 221 (e.g., Grant 1*b*) and 222 (e.g., Grant 2*b*) to the UE 202*b* and the UE 202*b* sends the UL data packets 223 (e.g., Data Ib) and 224 (e.g., Data 2*b*) according to the UL grants 221 and 222, respectively. The UE 202*c* switches between the grant-free mode and the grant-based mode. The UE 202*c* sends a UL data packet 232 (e.g., Data Ic) to the BS 204 based on a UL grant 231 (e.g., Grant Ic) received from the BS 204. Subsequently, the UE 202*c* sends a UL data packet 233 (e.g., Data 2*c*) to the BS 204 in the grant-free mode.

Each of the UL data packets 211, 212, 223, 224, 232, and 233 may include a UE ID assigned to a corresponding UE 202. For example, the BS 204 assigns each UE 202 a UE ID during an initial attachment. Thus, upon receiving the UL data packets 211, 212, 223, 224, 232, and 233, the BS 204 may determine the senders of the UL data packets 211, 212, 223, 224, 232, and 233 based on the UE IDs carried in the UL data packets 211, 212, 223, 224, 232, and 233.

When the UE 202*b* and 202*c* employ grant-free UL transmissions, collisions may occur, causing packet loss or packet corruption. Thus, the UE 202*b* and 202*c* may need confirmations from the BS 204 and retransmissions may be required. For example, the BS 204 may send an acknowledgement (ACK) to confirm successful receipt of a data packet transmitted by the UEs 202*b* or 202*c* in the grant-free mode. When the UE 202*b* or 202*c* fails to receive an ACK after the transmission, the UE 202*b* or 202*c* may retransmit the data packet, for example, after a timeout period.

Different types of traffic may benefit from grant-free and grant-based transmissions. For example, traffic with small-size packets low-latency constraint, and/or low reliability requirements may benefit from grant-free transmissions due to the removal of signaling overheads. Conversely, traffic with large-size packets, high reliability requirements, and relaxed latency constraints may not be suitable for grant-free transmissions. In addition, grant-free transmissions may not perform well when the network 200 has a high or heavy traffic loading. Further, a UE 202 with a high power loss (PL) may send UL data in a grant-free mode without causing significant interference in the network 200. However, it may not be desirable for a low-PL UE 202 to send data in a grant-free mode since transmissions from the low-PL UE 202 may generate significant interference in the network 200.

In an embodiment, small packets may refer to packets having a packet size less than about 32 bytes, whereas large packets may refer to packets having a packet size greater than about 32 bytes. A low-latency constraint may refer to a transmission or delivery latency constraint less than about 1 millisecond (ms), whereas a relaxed-latency constraint may refer to a transmission or delivery latency constraint greater than about 1 ms. A low-reliability may refer to a packet error rate greater than about 1%, whereas high-reliability may refer to a packet error rate less than about 1%. A heavy traffic or system loading may refer to a network in which about 60% of the network capacity or bandwidth is occupied, whereas a light traffic or system loading may refer to a network in which about 10% to about 20% of the network capacity or bandwidth is occupied.

To optimize performance and/or efficiency of the network 200, the BS 204 may dynamically configure the network 200 to allow and/or disallow grant-free UL transmissions based on various network conditions and/or measurements against the UE 202. The BS 204 may limit the UEs 202 from employing grant-free UL transmissions based on thresholds associated with PL, packet delays, and/or QoS. The UE 202 may dynamically select between grant-free and grant-based mode UL transmissions based on various conditions as described more fully below. Thus, the UE 202*a* may transmit UL data in the grant-based mode instead of the grant-free mode at a different time. Similarly, the UE 202*b* may transit UL data in the grant-free mode instead of a grant-based mode at a different time.

Figure 3:
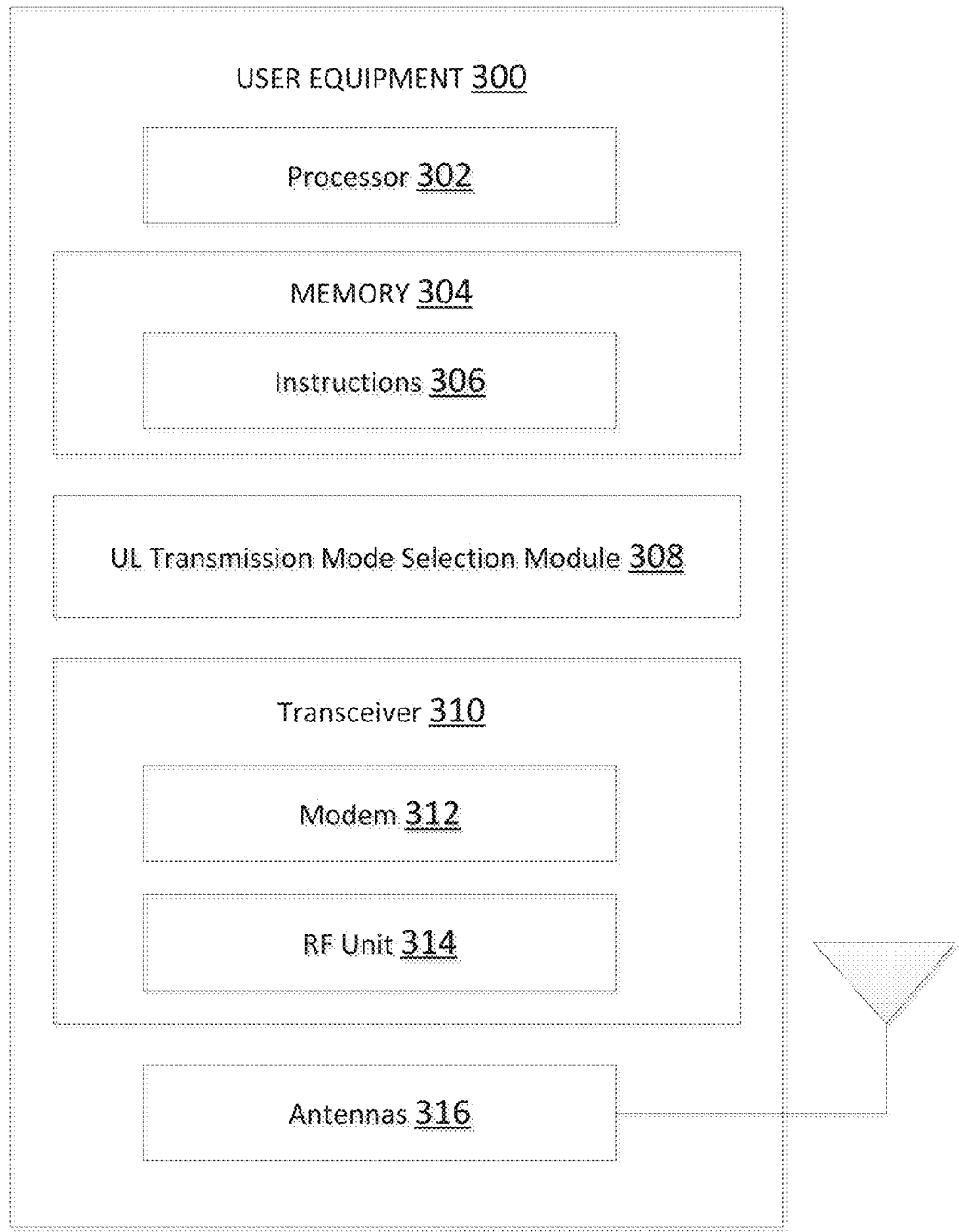
FIG. 3 is a block diagram of an exemplary user equipment (UE) according to embodiments of the present disclosure.

FIG. 3 is a block diagram of an exemplary UE 300 according to embodiments of the present disclosure. The UE 300 may be a UE 102 or 202 as discussed above. As shown, the UE 300 may include a processor 302, a memory 304, a UL transmission mode selection module 308, a transceiver 310 including a modem subsystem 312 and a RF unit 314, and an antenna 316. These elements may be in direct or indirect communication with each other, for example via one or more buses or other communication mediums.

The processor 302 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 202 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The UL transmission mode selection module 308 may be used for various aspects of the present disclosure. For example, the UL transmission mode selection module 308 is configured to select between grant-free UL transmission mode and grant-based UL transmission mode and perform grant-free UL transmissions, and/or grant-based UL transmissions based on the selection, as described in greater detail herein. In some scenarios, the module 308 may be provisioned with certain default operation conditions that can be later altered. These changes can be made in response to identifying dynamic operating conditions described herein or in response to commands or instructions issued by other communication components (e.g., a network BS providing instructions to a UE).

As shown, the transceiver 310 may include the modem subsystem 312 and the RF unit 314. The transceiver 310 can be configured to communicate bi-directionally with other devices, such as the BSs 104 and 204. The modem subsystem 312 may be configured to modulate and/or encode the data from the memory 304 and/or the UL transmission mode selection module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 102 or a BS 104. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 102 to enable the UE 102 to communicate with other devices.

The RF unit 314 may provide the modulated and/or processed data, e.g. data packets (or, more generally, data messages that may contain one or more data packets and other information), to the antenna 316 for transmission to one or more other devices. This may include, for example, transmission of a random access preamble or a connection request according to embodiments of the present disclosure. The antenna 316 may further receive data messages transmitted from other devices. This may include, for example, reception of a UL transmission mode configuration and UL grants according to embodiments of the present disclosure. The antenna 316 may provide the received data messages for processing and/or demodulation at the transceiver 310. Although FIG. 3 illustrates antenna 316 as a single antenna, antenna 316 may include multiple antennas of similar or different designs in order to sustain multiple transmission links. The RF unit 314 may configure the antenna 316

Figure 4:
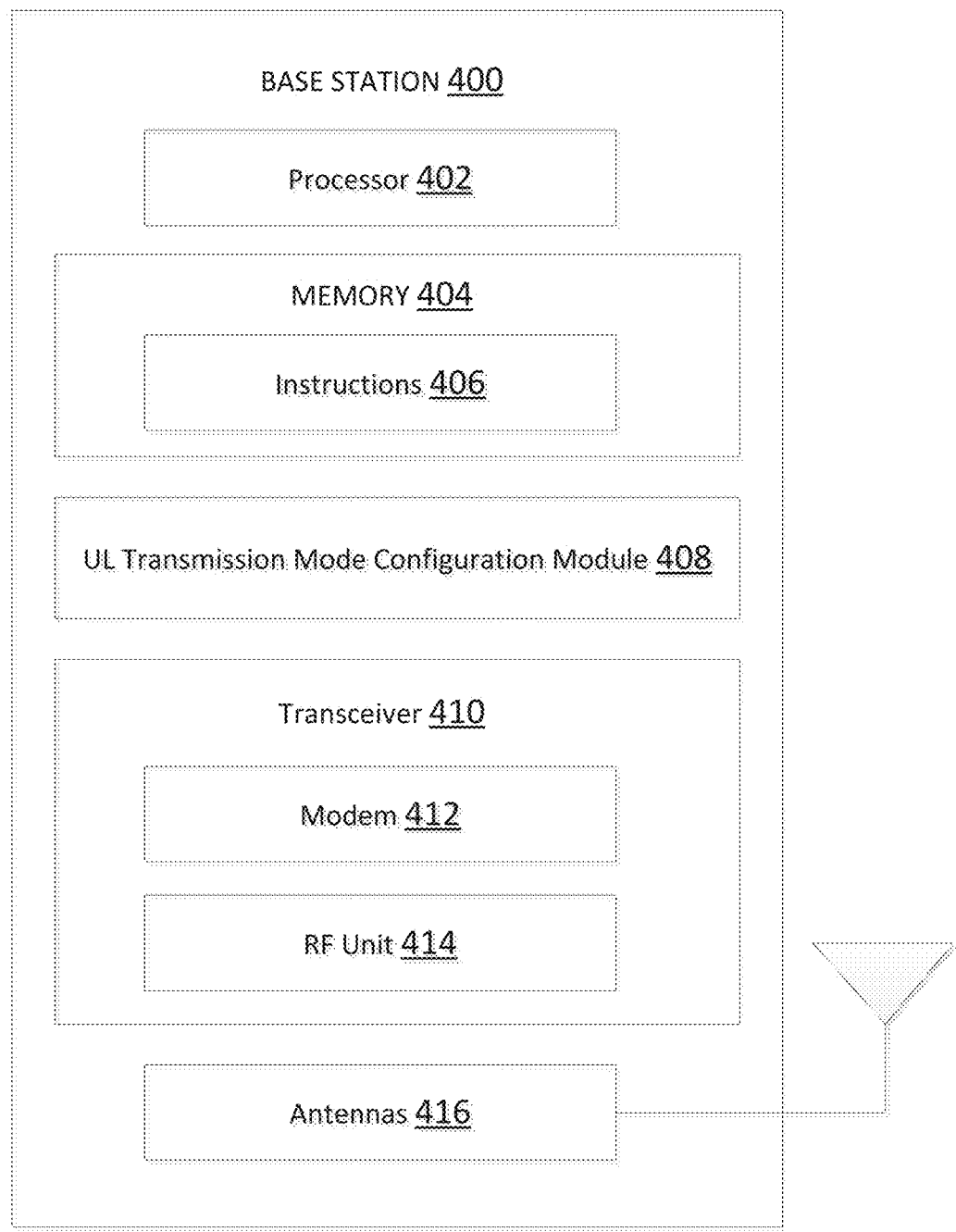
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 104 or 204 as discussed above. A shown, the BS 400 may include a processor 402, a memory 404, a UL transmission mode configuration module 408, a transceiver 410 including a modem subsystem 412 and a RF unit 414, and an antenna 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 3.

The UL transmission mode configuration module 408 may be used for various aspects of the present disclosure. For example, the UL transmission mode configuration module 408 may monitor various network conditions, for example, traffic loading, and dynamically configure the network to allow or disallow grant-free UL transmissions to optimize network performance, as described in greater detail herein.

As shown, the transceiver 410 may include the modem subsystem 412 and the RF unit 414. The transceiver 410 can be configured to communicate bi-directionally with other devices, such as the UEs 102, 202, and 302 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 102. Although shown as integrated together in transceiver 410, the modem subsystem 412 and the RF unit 414 may be separate devices that are coupled together at the BS 104 to enable the BS 104 to communicate with other devices.

The RF unit 414 may provide the modulated and/or processed data, e.g. data packets (or, more generally, data messages that may contain one or more data packets and other information), to the antenna 416 for transmission to one or more other devices. This may include, for example, transmission of information to complete attachment to a network and communication with a camped UE 102 according to embodiments of the present disclosure. The antenna 416 may further receive data messages transmitted from other devices and provide the received data messages for processing and/or demodulation at the transceiver 410. Although FIG. 4 illustrates antenna 416 as a single antenna, antenna 416 may include multiple antennas of similar or different designs in order to sustain multiple transmission links.

Figure 5:
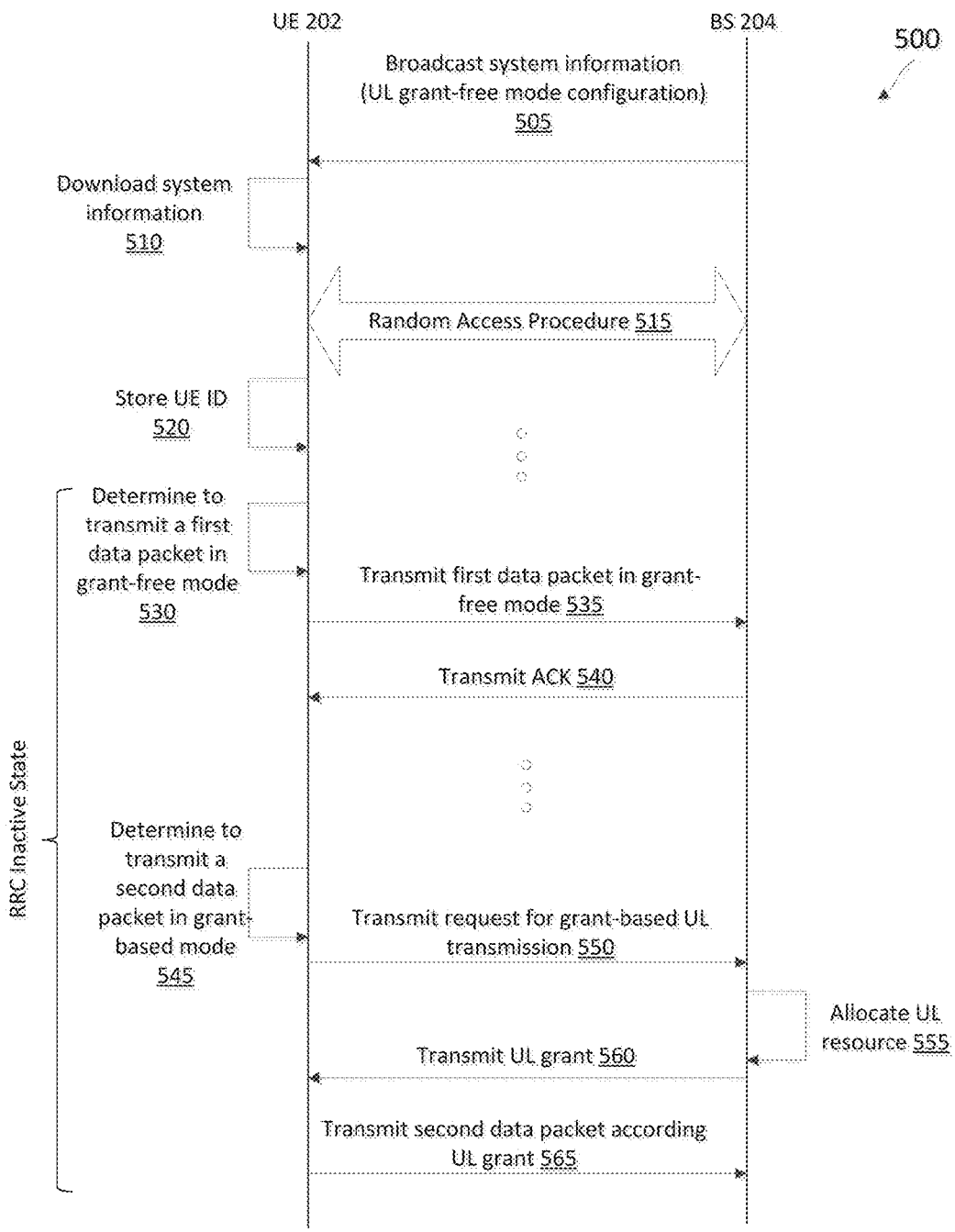
FIG. 5 is a protocol diagram of a method of dynamic selection of grant-free and grant-based UL transmissions according to embodiments of the present disclosure.

FIG. 5 is a protocol diagram of a method 500 of dynamic selection of grant-free and grant-based UL transmissions according to embodiments of the present disclosure. Steps of the method 500 can be executed by computing devices (e.g., a processor, processing circuit, and/or other suitable component) of wireless communication devices, such as the BSs 104, 204, and 400 and the UEs 102, 202, and 300. The method 500 can be better understood with reference to FIG. 2. The method 500 may employ similar mechanisms as in the network 200. As illustrated, the method 500 includes a number of enumerated steps, but embodiments of the method 500 may include additional steps before, after, and in between the enumerated steps. In some embodiments, one or more of the enumerated steps may be omitted or performed in a different order. The method 500 illustrates one BS 204 and one UE 202 for purposes of simplicity of discussion, though it will be recognized that embodiments of the present disclosure may scale to many more UEs 202 and/or BSs 204.

At step 505, the BS 204 broadcasts system, for example, in the form of master information blocks (MIBs) and/or system information blocks (SIBs). The system information may include cell access related information, a channel configuration, a physical random access (PRACH) configuration, and/or neighboring cell information. In addition, the system information may include a UL grant-free mode configuration. For example, the UL grant-free mode configuration may indicate whether grant-free UL transmission is allowed in the network and thresholds for grant-free UL transmission. The thresholds may be associated with UE-to-BS PL, packet size, and/or QoS. In addition, the UL grant-free mode configuration may indicate a subset of UL resources (e.g., physical time-frequency resource blocks) or a pool of signatures for grant-free transmissions. Accordingly, in some instances, the BS 204 may configure the UL grant-free mode configuration to indicate the subset of UL resources or the pool of signatures for grant-free transmissions. At step 510, the UE 202 downloads the system information. Accordingly, in some instances, the UE 202 may obtain the UL grant-free mode configuration from the system information and obtain the UL resources or the pool of signatures for grant-free transmissions from the UL grant-free mode configuration.

At step 515, the UE 202 performs a random access procedure to initiate communication with the BS 204. The step 515 may include multiple exchanges between the UE 202 and BS 204. For example, the UE 202 may begin with sending a random access preamble according to the PRACH configuration. Upon completion of the random access procedure, the BS 204 may assign a UE ID to the UE 202 for identifying the UE 202 in the network 200. At step 520, the UE 202 stores the UE ID, for example, in a memory similar to the memory 304. The UE 202 may include the UE ID in subsequent transmissions to the BS 204 so that the BS 204 may identify the UE 202 as the sender in subsequent transmissions.

After a period of time, the UE 202 may enter a RRC inactive state, for example, to save power. While in the RRC inactive state, a first application (e.g., an IoT application) executing on the UE 202 may have a first data packet to send. At step 530, the UE 202 determines to transmit the first data packet in a grant-free mode. For example, the UE 202 may determine that grant-free UL transmission is allowed in the network 200 based on the UL grant-free mode configuration and measurements of the UE 202 satisfy the thresholds. In addition, the UE 202 may determine that the first data packet is suitable for grant-free transmission based on properties of the first data packet. For example, the properties may include the packet size and the QoS requirement of the first data packet.

At step 535, the UE 202 transmits the first data packet in the grant-free mode. For example, the UE 202 randomly selects a UL resource for the transmission. Alternatively, the UE 202 may select a UL resource from the subset of UL resources indicated in the UL grant-free mode configuration. The UE 202 may transmit the first data packet using the selected UL resource, which is not allocated to the UE 202. In addition, the UE 202 may select a signature from the signature pool indicated in the UL grant-free mode configuration and include the signature in the transmission. At step 540, upon receiving the first data packet, the BS 204 transmits an ACK to acknowledge the receipt of the first data packet. In an embodiment, when the BS 204 fails to receive the first data packet to the UE 202 fails to receive the ACK, the UE 202 may retransmit the first data packet.

After another period of time, a second application executing on the UE 202 may have a second data packet to send. The first and second applications may be the same application or different applications. At step 545, the UE 202 determines to send the second data packet in a grant-based mode. For example, the second data packet may have a large packet size (e.g., greater than about 32 bytes) and/or a high reliability requirement (e.g., a packet error rate less than about 1%).

At step 550, the UE 202 transmits a request for grant-based UL transmission. At step 555, the BS 204 dynamically allocates a UL resource (e.g., physical time-frequency resource blocks) to the UE 202 based on the request. At step 560, the BS 204 sends a UL grant indicating the allocated UL resource. At step 565, the UE 202 sends the second data packet on the physical time-frequency resource blocks. As shown, the UE 202 may dynamically select between grant-based and grant-free UL transmissions based on application requirements and the UL grant-free mode configuration.

Figure 6:
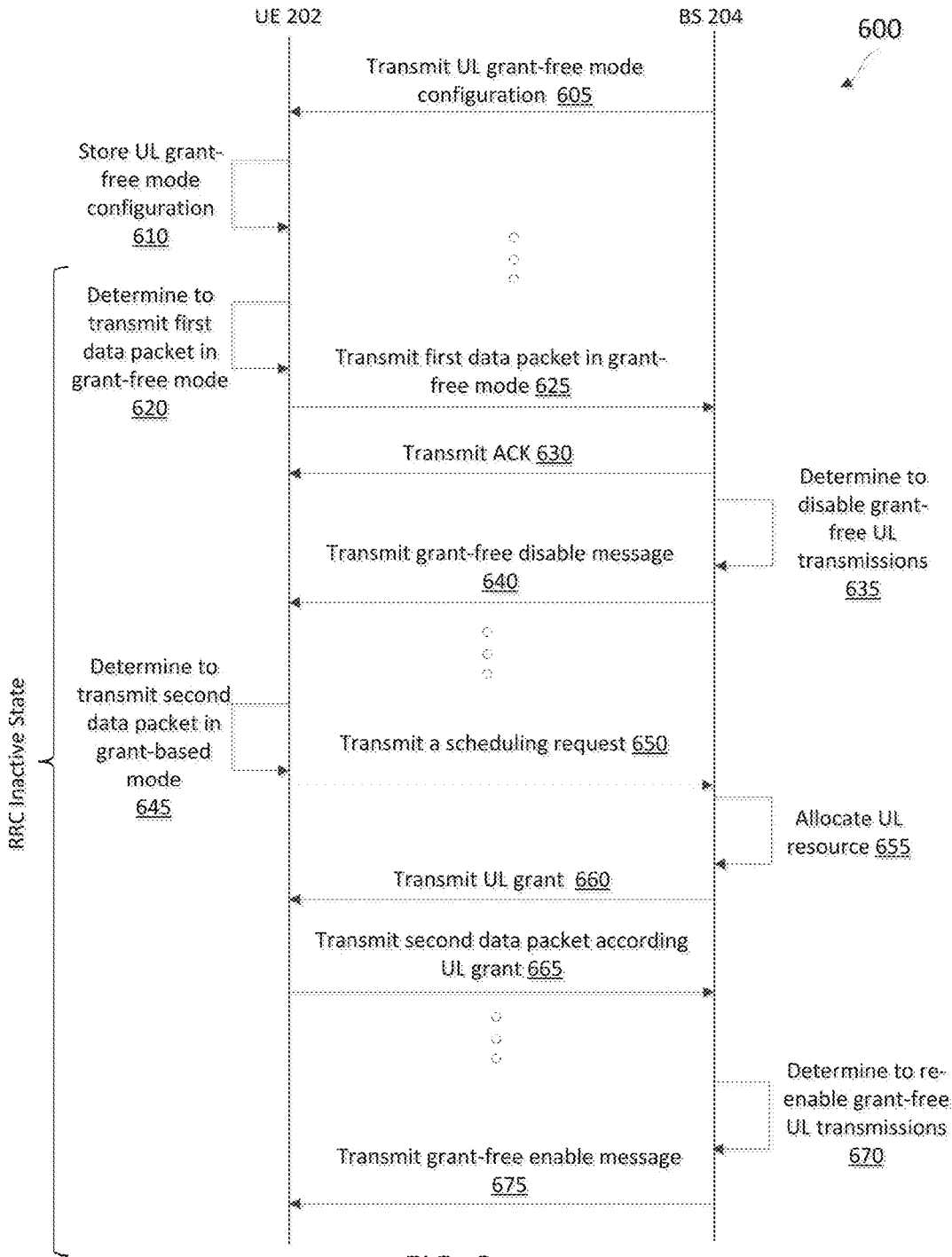
FIG. 6 is a protocol diagram of a method of dynamic configuration of grant-free and grant-based UL transmissions according to embodiments of the present disclosure.

FIG. 6 is a protocol diagram of a method 600 of dynamic configuration of grant-free and grant-based UL transmissions according to embodiments of the present disclosure. Steps of the method 600 can be executed by computing devices (e.g., a processor, processing circuit, and/or other suitable component) of wireless communication devices, such as the BSs 104, 204, and 400 and the UEs 102, 202, and 300. The method 600 can be better understood with reference to FIG. 2. The method 600 may employ similar mechanisms as in the network 200 and the method 500. As illustrated, the method 600 includes a number of enumerated steps, but embodiments of the method 600 may include additional steps before, after, and in between the enumerated steps. In some embodiments, one or more of the enumerated steps may be omitted or performed in a different order. The method 600 illustrates one BS 204 and one UE 202 for purposes of simplicity of discussion, though it will be recognized that embodiments of the present disclosure may scale to many more UEs 202 and/or BSs 204 (all having their own particular operating conditions or states).

At step 605, the BS 204 transmits a UL grant-free mode configuration, for example, in MIBs and/or SIBs or RRC messages. At step 610, the UE 202 stores the UL grant-free mode configuration. For example, the UE 202 may receive and store the UL grant-free mode configuration during an initial access as shown in the method 500. Alternatively, the UE 202 may receive the UL grant-free mode configuration while operating in a RRC inactive state. For example, the UE 202 may wake up at some period of time to receive MIBs and/or SIBs.

After a period of time, an application executing on the UE 202 may have a first data packet to send. At step 620, the UE 202 determines to transmit the first data packet in a grant-free mode based on the requirements of the first data packet and the UL grant-free mode configuration. At step 625, the UE 202 transmits the first data packet in the grant-free mode. At step 630, the BS 204 sends an ACK to acknowledge the first data packet.

At step 635, the BS 204 determines to disable grant-free UL transmissions in the network 200. For example, the system loading is heavy and exceeded a pre-determined threshold. The pre-determined threshold may vary in different embodiments. In some embodiments, the pre-determined threshold may be configured according to the system capacity, for example, at about 60% of the system capacity. At step 640, the BS 204 transmits a grant-free disable message to disallow grant-free UL transmission in the network 200. Accordingly, in some instances, the BS 204 may configure the grant-free disable message to indicate that grant-free UL transmission is disallowed in the in network 200.

After a period of time, the application may have a second data packet to send. At step 645, the UE 202 determines to transmit the second data packet in a grant-based mode. Although the second data packet may be suitable for grant-free transmission, the UE 202 may refer to the stored UL grant-free mode configuration and determine that grant-free UL transmission is disallowed in the network 200.

At step 650, the UE 202 sends a scheduling request. At step 655, the BS 204 dynamically allocates a UL resource based on the scheduling request. At step 660, the BS 204 transmits a UL grant indicating the allocated UL resource. At step 665, the UE 202 transmits the second data packet on the allocated UL resource.

After a period of time, at step 670, the BS 204 determines to re-enable grant-free UL transmissions in the network 200. For example, the system loading has returned to a light condition, for example, below the pre-determined threshold.

At step 675, the BS 204 transmits a grant-free enable message to allow grant-free UL transmission in the network 200. Accordingly, in some instances, the BS 204 may configure the grant-free enable message to indicate that grant-free UL transmission is allowed in the in network 200. Subsequently, the UE 202 may dynamically select to use grant-free or grant-based UL transmissions. As shown, the BS 204 may dynamically configure the network 200 to allow or disallow grant-free UL transmissions based on network conditions.

Figure 7:
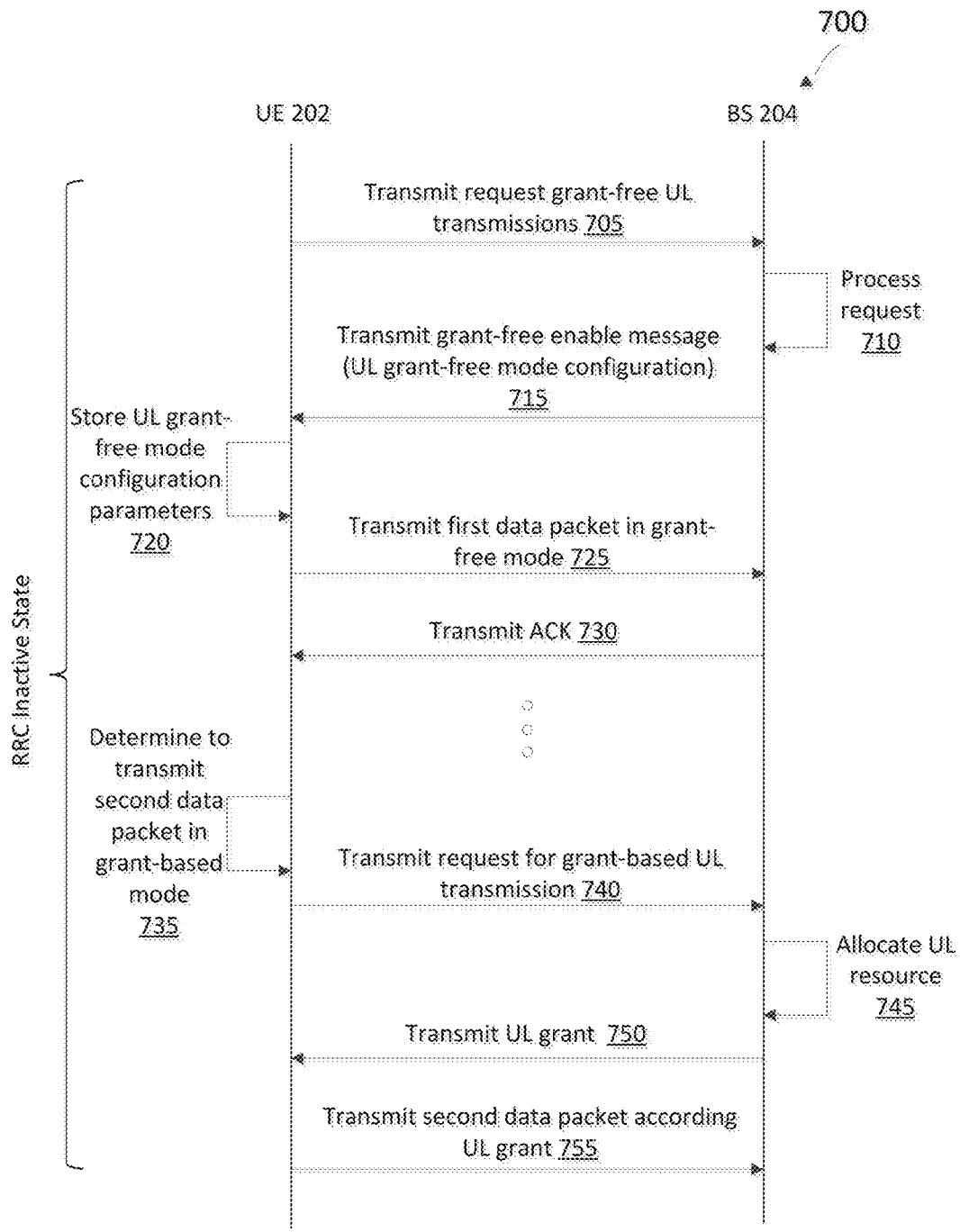
FIG. 7 is a protocol diagram of a method of dynamic request of grant-free and grant-based UL transmissions according to embodiments of the present disclosure.

FIG. 7 is a protocol diagram of a method 700 of dynamic request of grant-free and grant-based UL transmissions according to embodiments of the present disclosure. Steps of the method 700 can be executed by computing devices (e.g., a processor, processing circuit, and/or other suitable component) of wireless communication devices, such as the BSs 104, 204, and 400 and the UEs 102, 202, and 300. The method 700 can be better understood with reference to FIG. 2. The method 700 may employ similar mechanisms as in the network 200 and the methods 500 and 600. As illustrated, the method 700 includes a number of enumerated steps, but embodiments of the method 700 may include additional steps before, after, and in between the enumerated steps. In some embodiments, one or more of the enumerated steps may be omitted or performed in a different order. The method 700 illustrates one BS 204 and one UE 202 for purposes of simplicity of discussion, though it will be recognized that embodiments of the present disclosure may scale to many more UEs 202 and/or BSs 204.

At step 705, the UE 202 transmits a request for grant-free UL transmissions. For example, information associated with UL grant-free mode configuration is not broadcast in the network. At step 710, the BS 204 processes the request. For example, the BS 204 determines to allow the UE 202 to transmit UL data in a grant-free mode (e.g., based on PL and/or network loading). At step 715, the BS 204 transmits a grant-free enable message. The grant-free enable message may include a UL grant-free mode configuration. Accordingly, in some instances, the BS 204 may configure the grant-free enable message to indicate that grant-free transmission is allowed. At step 720, the UE 202 stores the UL grant-free mode configuration.

At step 725, the UE 202 transmits a first data packet in the grant-free mode. The UE 202 may receive the first data packet from a first application executing on the UE 202. At step 730, the BS 204 transmits an ACK to acknowledge the receipt of the first data packet.

After a period of time, a second application executing on the UE 202 may have a second data packet to send. At step 735, the UE 202 determines to transmit the second data packet in a grant-based mode, for example, based on packet requirements and the UL grant-free mode configuration. At step 740, the UE 202 sends a request for a grant-based UL transmission. At step 745, the BS 204 allocates a UL resource. At step 750, the BS 204 sends a UL grant indicating the allocated UL resource. At step 755, the UE 202 sends the second data packet on the allocated UL resource according to the UL grant. As shown, the UE 202 may dynamically request for grant-free or grant-based UL transmissions.

Figure 8:
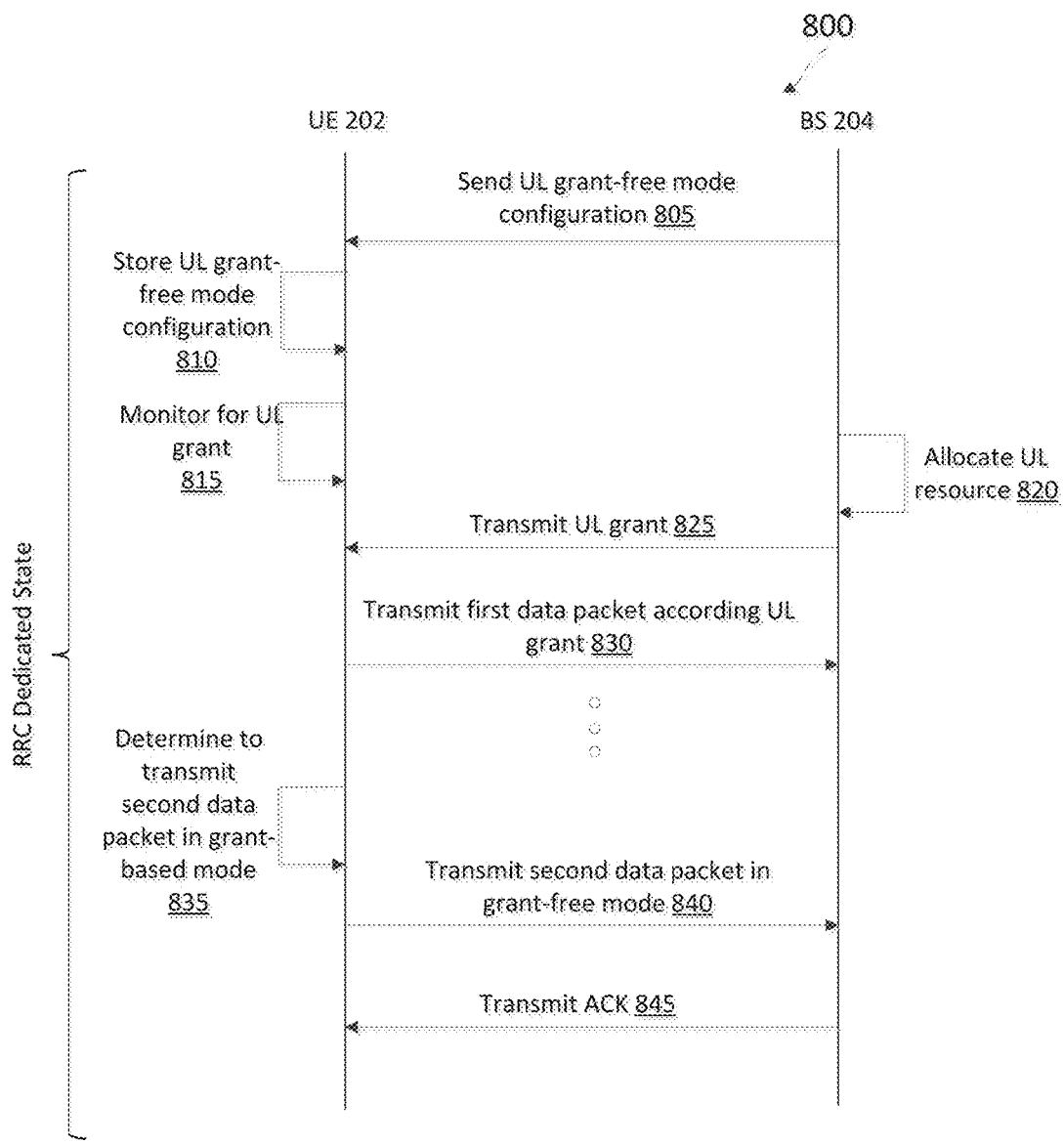
FIG. 8 is a protocol diagram of a method of hybrid grant-free and grant-based UL transmissions according to embodiments of the present disclosure.

FIG. 8 is a protocol diagram of a method 800 of hybrid grant-free and grant-based UL transmissions according to embodiments of the present disclosure. Steps of the method 800 can be executed by computing devices (e.g., a processor, processing circuit, and/or other suitable component) of wireless communication devices, such as the BSs 104, 204, and 400 and the UEs 102, 202, and 300. The method 800 can be better understood with reference to FIG. 2. The method 800 may employ similar mechanisms as in the network 200 and the methods 500, 600, and 700. As illustrated, the method 800 includes a number of enumerated steps, but embodiments of the method 800 may include additional steps before, after, and in between the enumerated steps. In some embodiments, one or more of the enumerated steps may be omitted or performed in a different order. The method 800 illustrates one BS 204 and one UE 202 for purposes of simplicity of discussion, though it will be recognized that embodiments of the present disclosure may scale to many more UEs 202 and/or BSs 204. In the method 800, the UE 202 is in a RRC dedicated state. For example, the UE 202 may be actively communicating with the BS 204 and may be configured with dedicated resources.

At step 805, the BS 204 transmits a UL grant-free mode configuration. At step 810, the UE 202 stores the UL grant-free mode configuration. At step 815, the UE 202 monitors for UL grants from the BS 204. In some embodiment, the UE 202 may monitor for UL grants in a number of subframes within a radio frame.

At step 820, the BS 204 allocates a UL resource to the UE 202. At step 825, the BS 204 transmits a UL grant indicating the allocated UL resource. At step 830, the UE 202 transmits a first data packet according to the UL grant. For example, the UE 202 may receive the first data packet from a first application executing on the UE 202. It should be noted that although the first data packet may be suitable for grant-free transmission, the grant-based transmission may take precedence.

After a period of time, a second application executing on the UE 202 may have a second data packet to send. The first and second applications may be the same application or different applications. At step 835, the UE 202 determines to transmit the second data packet in a grant-free mode. For example, the UE 202 determines that the second data packet is suitable for grant-free transmission and there is no UL grant received from the BS 204. At step 840, the UE 202 transmits the second data packet in the grant-free mode. At step 845, the BS 204 transmits an ACK to acknowledge the receipt of the second data packet. As shown, the UE 202 may use grant-free UL transmissions while monitoring for UL grants in the RRC dedicated state and may allow grant-based UL transmissions to take precedence over grant-free transmissions.

In the methods 500-800, the BS 204 may send the UL grant-free mode configuration at various layers. In one embodiment, the BS 204 may send the UL grant-free mode configuration in an open system interconnection (OSI) layer 1 (L1). For example, the UL grant-free mode configuration may be carried in physical downlink control information (DCI). In another embodiment, the BS 204 may send the UL grant-free mode configuration in an OSI layer 2 (L2) or the media access control (MAC) layer. For example, the UL grant-free mode configuration may be carried in a MAC control element (CE). In another embodiment, the BS 204 may send the UL grant-free mode configuration in an OSI layer 3 (L3). For example, the UL grant-free mode configuration may be carried in a RRC message. The sending of the UL grant-free mode configuration in L3 may be most reliable, but may incur the highest overhead. Conversely, the sending of the UL grant-free mode configuration in L1 may incur the least amount of overhead, but may be the least reliable.

Figure 9:
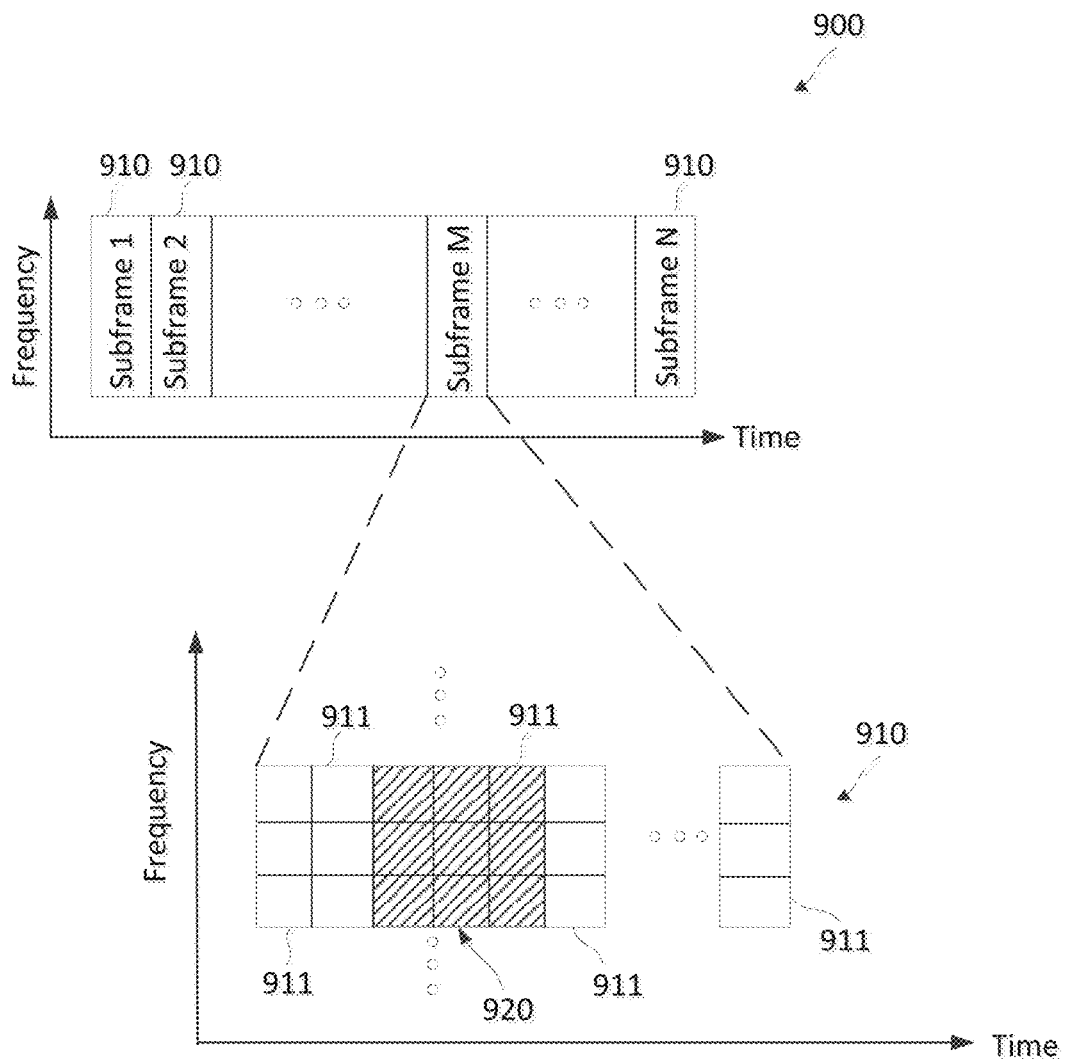
FIG. 9 illustrates a radio frame according to embodiments of the present disclosure.

FIG. 9 illustrates a radio frame 900 according to embodiments of the present disclosure. The radio frame 900 may be employed by the networks 100 and 200 and the methods 500, 600, 700, and 800. In particular, BSs such as the BSs 104 and 204 and UEs such as the UEs 102 and 202 may exchange data using the radio frame 900. In FIG. 9, the x-axes represent time in some constant units and the y-axes represent frequency in some constant units. The radio frame 900 includes N plurality of subframes 910 spanning in time and frequency. Each subframe 910 includes a plurality of time-frequency resource blocks 911. The BS 204 may allocate resources from the resource blocks 911 for UL and DL transmissions. The BS 204 may employ different allocation schemes for TDD and FDD. In an embodiment, the BS 204 may allocate a pool of resource blocks 911 from one or more subframes 910 for grant-free transmissions so that grant-free transmissions may not collide with grant-based transmissions. For example, the BS 204 allocates a pool 920 of resource blocks 911 from an $M^{th}$ subframe 910 for grant-free transmissions as shown by the patterned boxes. The resource blocks 911 in the pool 920 are not dedicated to any specific UE. However, a UE may randomly select one or more of the resource blocks 911 from the pool 920 for grant-free UL transmissions.

Figure 10:
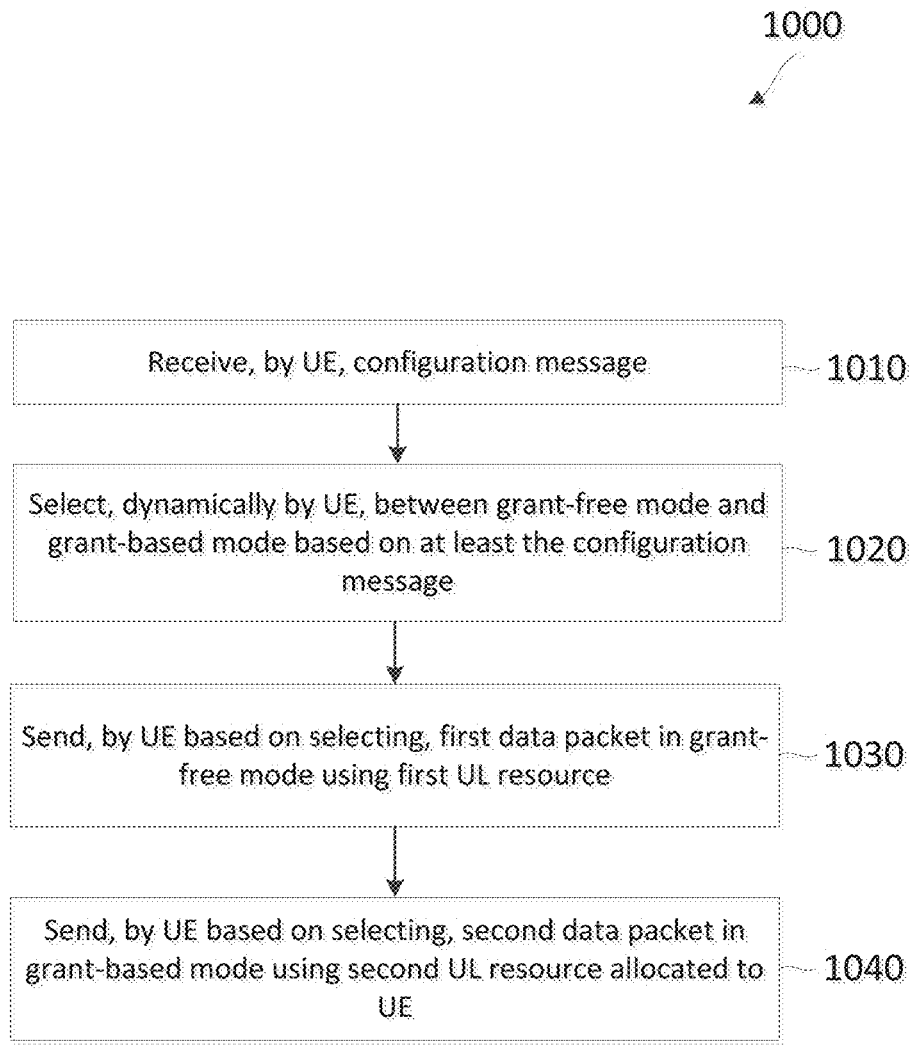
FIG. 10 is a flow diagram of a method of performing hybrid grant-free and grant-based UL transmissions according to embodiments of the present disclosure.

FIG. 10 is a flow diagram of a method 1000 of performing hybrid grant-free and grant-based UL transmissions according to embodiments of the present disclosure. Steps of the method 1000 can be executed by a computing device (e.g., a processor, processing circuit, and/or other suitable component) of a wireless communication device, such as the UEs 202 and 300. The method 1000 may employ similar mechanisms as described with respect to the network 200 and the methods 500-800. The method 1000 can be better understood with reference to FIG. 2. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the method 1000 includes receiving, by a UE (e.g., the UE 202), a configuration message. The configuration message indicates whether UL data transmission in a grant-free mode is allowed. Accordingly, in some instances, the UE may determine whether UL data transmission in a grant-free mode is allowed from the configuration message. The configuration message may be similar to the UL grant-free mode configuration described in the methods 500-800. The configuration message may be include in a broadcast MIB and/or SIB or a RRC message.

At step 1020, the method 1000 includes selecting, dynamically by the UE, between the grant-free mode and a grant-based mode based on at least the configuration message. For example, the UE may perform the selection for each UL packet based on the configuration message and properties (e.g., packet size and/or QoS requirement) of the packet.

At step 1030, the method 1000 includes sending, by the UE, a first data packet in the grant-free mode using a first UL resource (e.g., the resource blocks 911). The first UL resource is randomly selected by the UE and not included in a schedule provided by a BS (e.g., the BS 204). For example, the UE may randomly select the first UL resource from a UL region of a radio frame such as the radio frame 900. Alternatively, the UE may select the first UL resource from a resource pool (e.g., the pool 920) pre-configured for grant-free UL transmissions.

At step 1040, the method 1000 includes sending, by the UE, a second data packet in the grant-based mode using a second UL resource (e.g., the resource blocks 911) allocated to the UE. The second UL resource refers to a resource scheduled specifically for the UE by the BS.

Figure 11:
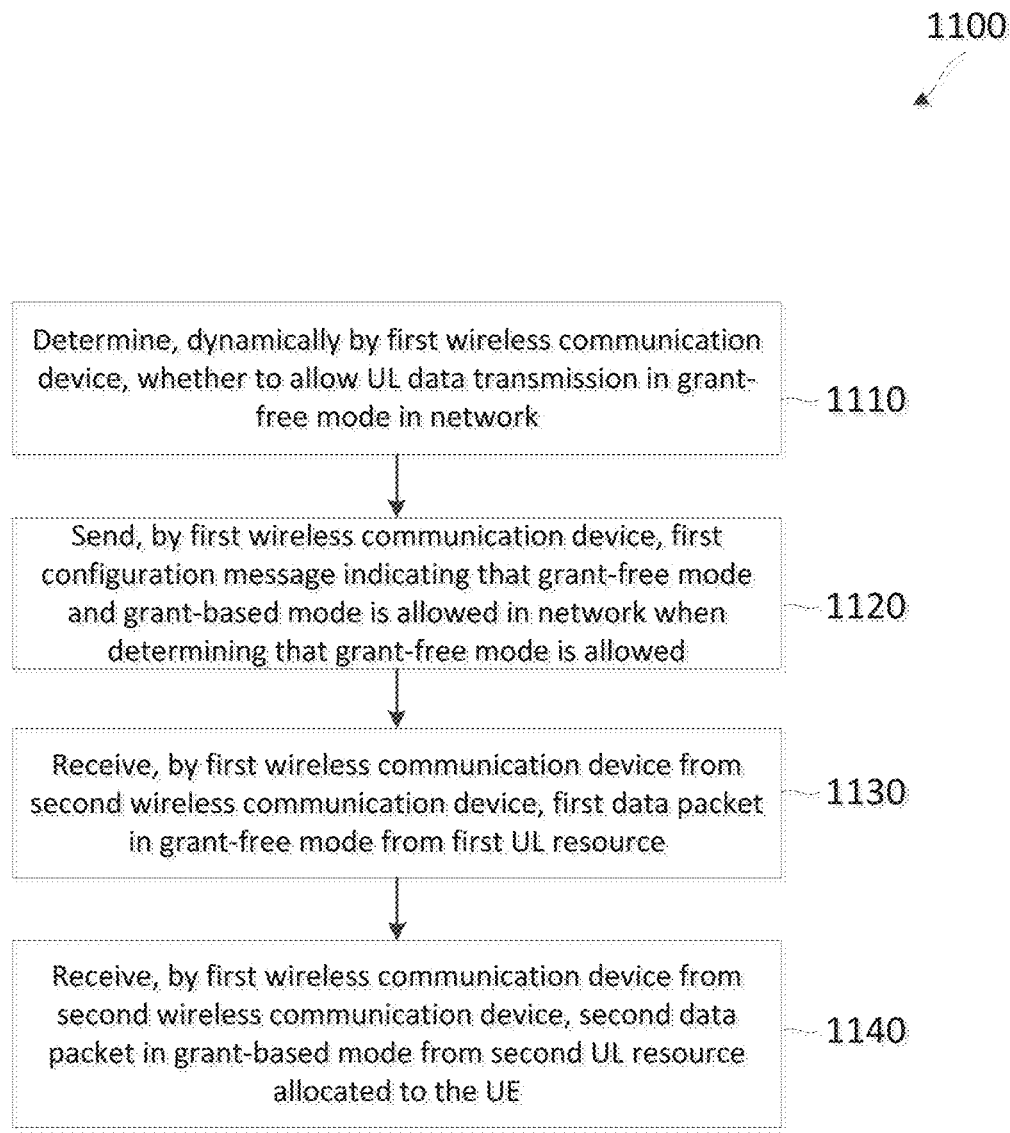
FIG. 11 is a flow diagram of a method of performing hybrid grant-free and grant-based UL transmissions according to embodiments of the present disclosure.

FIG. 11 is a flow diagram of a method 1100 of performing hybrid grant-free and grant-based UL transmissions according to embodiments of the present disclosure. Steps of the method 1100 can be executed by a computing device (e.g., a processor, processing circuit, and/or other suitable component) of a wireless communication device, such as the BSs 204 and 400. The method 1100 may employ similar mechanisms as described with respect to the network 200 and the methods 500-800. The method 1100 can be better understood with reference to FIG. 2. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes determining, dynamically by a first wireless communication device (e.g., the BS 204), whether to allow UL data transmission in a grant-free mode and a grant-based mode in a network. For example, the grant-mode is allowed when the network loading is below a first threshold and disallowed when then network loading is above a second threshold. The first threshold and the second threshold may be the same or different.

At step 1120, the method 1100 includes sending, by the BS, a first configuration message indicating the grant-free mode is allowed in the network when determining that the grant-free mode is allowed. The first configuration message may be similar to the UL grant-free mode configuration described in the methods 500-800. The first configuration message may be carried in a MIB, a SIB, or a RRC message.

At step 1130, the method 1100 includes receiving, by the first wireless communication device from a second wireless communication device (e.g., the UE 202), a first data packet in the grant-free mode from a first UL resource (e.g., the resource blocks 911). The first UL resource refers to a resource that is not included in a UL schedule assigned by the first wireless communication device. For example, the first wireless communication device may monitor for UL data from any UE in the first unallocated UL resource, rather than a specific scheduled UE.

At step 1140, the method 1100 includes receiving, by the first wireless communication device from the second wireless communication device, a second data packet in the grant-based mode from a second UL resource allocated to the UE. The second UL resource refers to a resource scheduled specifically for the second wireless communication device to transmit and the first wireless communication device is monitoring for UL data from the second wireless communication device in the second UL resource.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C). It is also contemplated that the features, components, actions, and/or steps described with respect to one embodiment may be structured in different order than as presented herein and/or combined with the features, components, actions, and/or steps described with respect to other embodiments of the present disclosure.

Embodiments of the present disclosure include a method comprising selecting, dynamically by the UE, between a grant-free mode and a grant-based mode based on at least a transmission configuration. The method further includes sending, by the UE based on the selecting, a first data packet in the grant-free mode using a first uplink (UL) resource. The method further includes sending, by the UE based on the selecting, a second data packet in the grant-based mode using a second UL resource allocated to the UE.

The method further includes receiving, by the UE, the transmission configuration. The method further includes obtaining, by the UE from the transmission configuration, a rule indicating that the grant-free mode is allowed when the rule is satisfied, the rule associated with at least one of a path loss, a packet size, a delay constraint, or a quality of service (QoS) requirement, wherein the selecting further includes determining, by the UE, that the rule is satisfied prior to sending the first data packet in the grant-free mode. The method further includes determining, by the UE, that the grant-free mode is allowed based on the transmission configuration, wherein the selecting further includes selecting between the grant-free mode and the grant-based mode based on a property of the first data packet or the second data packet. The method further includes determining, by the UE, that the grant-free mode is allowed based on the transmission configuration; and monitoring, by the UE, for a UL grant, wherein the selecting further includes selecting the grant-free mode when no UL grant is received. The method further includes receiving, by the UE, the UL grant indicating the second UL resource allocated to the UE, wherein the selecting further includes selecting the grant-based mode when the UL grant is received. The method further includes obtaining, by the UE from the transmission configuration, a plurality of UL resources allowed for the grant-free mode; and selecting, by the UE, the first UL resource from the plurality of UL resources for sending the first data packet. The method further includes obtaining, by the UE from the transmission configuration, a plurality of signatures for the grant-free mode; and selecting, by the UE, a first signature from the plurality of signatures, wherein the sending the first data packet further includes sending the first data packet according to the first signature.

Embodiments of the present disclosure further include a method comprising determining, dynamically by a first wireless communication device, whether to allow uplink (UL) data transmission in a grant-free mode in a network. The method further includes sending, by the first wireless communication device, a first configuration message indicating that the grant-free mode is allowed in the network when determining that the grant-free mode is allowed. The method further includes receiving, by the first wireless communication device from a second wireless communication device, a first data packet in the grant-free mode from a first UL resource. The method further includes receiving, by the first wireless communication device from the second wireless communication device, a second data packet in a grant-based mode from a second UL resource allocated to the second wireless communication device.

The method further includes configuring, by the first wireless communication device, the first configuration message to indicate that the grant-free mode is allowed when a rule is satisfied, and wherein the rule is associated with at least one of a path loss, a packet size, a delay constraint, or a quality of service (QoS) requirement. The method further includes sending, by the first wireless communication device, a UL grant indicating the second UL resource allocated to the second wireless communication device. The method further includes determining further includes determining that the grant-free mode is disallowed when a loading of the network is above a threshold, and wherein the method further comprises sending, by the first wireless communication device, a second configuration message indicating that the grant-free mode is disallowed when determining that the grant-free mode is disallowed. The method further includes the determining further includes determining that the grant-free mode is allowed when a loading of the network is below a threshold. The method further includes configuring, by the first wireless communication device, the first configuration message to indicate a plurality of UL resources pre-configured for the grant-free mode, wherein the first UL resource is one of the plurality of UL resources. The method further includes configuring, by the first wireless communication device, the first configuration message to indicate a plurality of signatures pre-configured for the grant-free mode, and wherein the first data packet is associated with one of the plurality of signatures.

Embodiments of the present disclosure further include a wireless communication device comprising a receiver configured to receive a configuration message. The wireless communication device further includes a processor configured to dynamically select between a grant-free mode and a grant-based mode based on at least the configuration message. The wireless communication device further includes a transmitter configured to send, based on the selecting, a first data packet in the grant-free mode using a first uplink (UL) resource. The transmitter is further configured to send, based on the selecting, a second data packet in the grant-based mode using a second UL resource allocated to the wireless communication device.

The wireless communication device further includes wherein the configuration message indicates that the grant-free mode is allowed when a rule is satisfied, wherein the rule is associated with at least one of a path loss, a packet size, a delay constraint, or a quality of service (QoS) requirement, and wherein the processor is further configured to select between the grant-free mode and the grant-based mode by determining that the rule is satisfied prior to sending the first data packet in the grant-free mode. The wireless communication device further includes wherein the configuration message indicates that the grant-free mode is allowed, and wherein the processor is further configured to select between the grant-free mode and the grant-based mode by selecting between the grant-free mode and the grant-based mode based on a property of the first data packet or the second data packet. The wireless communication device further includes wherein the configuration message indicates that the grant-free mode is allowed, and wherein the processor is further configured to monitor for a UL grant; and select between the grant-free mode and the grant-based mode by selecting the grant-free mode when no UL grant is received. The wireless communication device further includes wherein the receiver is further configured to receive the UL grant indicating the second UL resource allocated to the UE, and wherein the processor is further configured to select between the grant-free mode and the grant-based mode by selecting the grant-based mode when the UL grant is received. The wireless communication device further includes wherein the processor is further configured to select the first UL resource randomly. The wireless communication device further includes wherein the configuration message further indicates a plurality of UL resources allowed for the grant-free mode, and wherein the processor is further configured to select the first UL resource from the plurality of UL resources for sending the first data packet. The wireless communication device further includes wherein the configuration message further indicates a plurality of signatures for the grant-free mode, wherein the processor is further configured to select a first signature from the plurality of signatures, and wherein the first data packet is transmitted according to the first signature.

Embodiments of the present disclosure further include an apparatus comprising a processor configured to dynamically determine whether to allow uplink (UL) data transmission in a grant-free mode in a network. The apparatus further includes a transmitter configured to send a first configuration message indicating that the grant-free mode is allowed in the network when determining that the grant-free mode is allowed. The apparatus further includes a receiver configured to receive, from a wireless communication device, a first data packet in the grant-free mode from a first UL resource; and receive, from the wireless communication device, a second data packet in a grant-based mode from a second UL resource allocated to the wireless communication device.

The apparatus further includes wherein the first configuration message further indicates that the grant-free mode is allowed when a rule is satisfied, and wherein the rule is associated with at least one of a path loss, a packet size, a delay constraint, or a quality of service (QoS) requirement. The apparatus further includes wherein the transmitter is further configured to send a UL grant indicating the second UL resource allocated to the wireless communication device. The apparatus further includes wherein the processor is further configured to determine whether to allow the grant-free mode by determining that the grant-free mode is disallowed when a loading of the network is above a threshold, and wherein the transmitter is further configured to send a second configuration message indicating that the grant-free mode is disallowed when determining that the grant-free mode is disallowed. The apparatus further includes wherein the processor is further configured to determine whether to allow the grant-free mode by determining that the grant-free mode is allowed when a loading of the network is below a threshold. The apparatus further includes wherein the first configuration message further indicates a plurality of UL resources pre-configured for the grant-free mode, and wherein the first UL resource is one of the plurality of UL resources. The apparatus further includes wherein the first configuration message further indicates a plurality of signatures pre-configured for the grant-free mode, and wherein the first data packet is associated with one of the plurality of signatures.

Embodiments of the present disclosure further include a computer-readable medium having program code recorded thereon, the program code comprising code for causing a user equipment (UE), to receive a configuration message. The program code further includes code for causing the UE to dynamically select between a grant-free mode and a grant-based mode based on at least the configuration message. The program code further includes code for causing the UE to send, based on the selecting, a first data packet in the grant-free mode using a first uplink (UL) resource. The program code further includes code for causing the UE to send, based on the selecting, a second data packet in the grant-based mode using a second UL resource allocated to the UE.

The computer-readable medium further includes wherein the configuration message indicates that the grant-free mode is allowed when a rule is satisfied, and wherein the code for selecting between the grant-free mode and the grant-based mode is further configured to determine that the rule is satisfied prior to sending the first data packet in the grant-free mode. The computer-readable medium further includes wherein the rule is associated with at least one of a path loss, a packet size, a delay constraint, or a quality of service (QoS) requirement. The computer-readable medium further includes wherein the configuration message indicates that the grant-free mode is allowed, and wherein the code for selecting between the grant-free mode and the grant-based mode is further configured to select between the grant-free mode and the grant-based mode based on a property of the first data packet or the second data packet. The computer-readable medium further includes wherein the configuration message indicates that the grant-free mode is disallowed. The computer-readable medium further includes code for causing the UE to send a request message requesting for the grant-free mode, wherein the configuration message is received in response to the request message. The computer-readable medium further includes wherein the configuration message indicates that the grant-free mode is allowed, wherein the program code further comprises code for causing the UE to monitor for a UL grant, and wherein the code for selecting between the grant-free mode and the grant-based mode is further configured to select the grant-free mode when no UL grant is received. The computer-readable medium further includes code for causing the UE to receive the UL grant indicating the second UL resource allocated to the UE, wherein the code for selecting between the grant-free mode and the grant-based mode is further configured to select the grant-based mode when the UL grant is received. The computer-readable medium further includes code for causing the UE to select the first UL resource randomly. The computer-readable medium further includes wherein the configuration message further indicates a plurality of UL resources allowed for the grant-free mode, and wherein the program code further comprises code for causing the UE to select the first UL resource from the plurality of UL resources for sending the first data packet. The computer-readable medium further includes wherein the configuration message further indicates a plurality of signatures for the grant-free mode, wherein the program code further comprises code for causing the UE to select a first signature from the plurality of signatures, and wherein the first data packet is transmitted according to the first signature. The computer-readable medium further includes wherein the configuration message is a broadcast system information message, a physical layer control signaling, a media access control (MAC) layer control element, or a network layer radio resource control (RRC) configuration message.

Embodiments of the present disclosure further include a computer-readable medium having program code recorded thereon, the program code comprising code for causing a first wireless communication device to dynamically determine whether to allow uplink (UL) data transmission in a grant-free mode in a network. The program code further includes code for causing a first wireless communication device to send a first configuration message indicating that the grant-free mode is allowed in the network when determining that the grant-free mode is allowed. The program code further includes code for causing a first wireless communication device to receive, from a second wireless communication device, a first data packet in the grant-free mode from a first UL resource. The program code further includes code for causing a first wireless communication device to receive, from the second wireless communication device, a second data packet in a grant-based mode from a second UL resource allocated to the second wireless communication device.

The computer-readable medium further includes wherein the first configuration message further indicates that the grant-free mode is allowed when a rule is satisfied, and wherein the rule is associated with at least one of a path loss, a packet size, a delay constraint, or a quality of service (QoS) requirement. The computer-readable medium further includes code for causing a first wireless communication device to receive, from the second wireless communication device, a request message requesting UL transmission in the grant-based mode when the grant-free mode is allowed, and code for causing a first wireless communication device to send a UL grant indicating the second UL resource allocated to the second wireless communication device. The computer-readable medium further includes code for causing a first wireless communication device to send a second configuration message indicating that the grant-free mode is disallowed when determining that the grant-free mode is disallowed. The computer-readable medium further includes wherein the code for determining whether to allow the grant-free mode is further configured to determine that the grant-free mode is disallowed when a loading of the network is above a threshold. The computer-readable medium further includes wherein the code determining whether to allow the grant-free mode is further configured to determine that the grant-free mode is allowed when a loading of the network is below a threshold. The computer-readable medium further includes code for causing a first wireless communication device to receive, from the second wireless communication device, a request message requesting for the grant-free mode, wherein the first configuration message is sent in response to the request message. The computer-readable medium further includes wherein the first configuration message further indicates a plurality of UL resources pre-configured for the grant-free mode, and wherein the first UL resource is one of the plurality of UL resources. The computer-readable medium further includes wherein the first configuration message further indicates a plurality of signatures pre-configured for the grant-free mode, and wherein the first data packet is associated with one of the plurality of signatures.

Embodiments of the present disclosure further include a wireless communication device comprising means for receiving a configuration message. The wireless communication device further includes means for selecting, dynamically, between a grant-free mode and a grant-based mode based on at least the configuration message. The wireless communication device further includes means for sending, based on the selecting, a first data packet in the grant-free mode using a first uplink (UL) resource. The wireless communication device further includes means for sending, based on the selecting, a second data packet in the grant-based mode using a second UL resource allocated to the UE.

The wireless communication device further includes wherein the configuration message indicates that the grant-free mode is allowed when a rule is satisfied, and wherein the means for selecting between the grant-free mode and the grant-based mode is further configured to determine that the rule is satisfied prior to sending the first data packet in the grant-free mode. The wireless communication device further includes wherein the rule is associated with at least one of a path loss, a packet size, a delay constraint, or a quality of service (QoS) requirement. The wireless communication device further includes wherein the configuration message indicates that the grant-free mode is allowed, and wherein the means for selecting between the grant-free mode and the grant-based mode is further configured to select between the grant-free mode and the grant-based mode based on a property of the first data packet or the second data packet. The wireless communication device further includes wherein the configuration message indicates that the grant-free mode is disallowed. The wireless communication device further includes means for sending a request message requesting for the grant-free mode, wherein the configuration message is received in response to the request message. The wireless communication device further includes wherein the configuration message indicates that the grant-free mode is allowed, wherein the wireless communication device further comprises means for monitoring for a UL grant, and wherein the means for selecting between the grant-free mode and the grant-based mode further is further configured to select the grant-free mode when no UL grant is received. The wireless communication device further includes means for receiving the UL grant indicating the second UL resource allocated to the UE, wherein the means for selecting between the grant-free mode and the grant-based mode is further configured to select the grant-based mode when the UL grant is received. The wireless communication device further includes means for selecting the first UL resource randomly. The wireless communication device further includes wherein the configuration message further indicates a plurality of UL resources allowed for the grant-free mode, and wherein the wireless communication device further comprises means for selecting the first UL resource from the plurality of UL resources for sending the first data packet. The wireless communication device further includes wherein the configuration message further indicates a plurality of signatures for the grant-free mode, wherein the wireless communication device further comprises means for selecting a first signature from the plurality of signatures, and wherein the first data packet is transmitted according to the first signature. The wireless communication device further includes wherein the configuration message is a broadcast system information message, a physical layer control signaling, a media access control (MAC) layer control element, or a network layer radio resource control (RRC) configuration message.

Embodiments of the present disclosure further include an apparatus comprising means for determining, dynamically, whether to allow uplink (UL) data transmission in a grant-free mode in a network. The apparatus further includes means for sending a first configuration message indicating that the grant-free mode is allowed in the network when determining that the grant-free mode is allowed. The apparatus further includes means for receiving, from a wireless communication device, a first data packet in the grant-free mode from a first UL resource. The apparatus further includes means for receiving, from the wireless communication device, a second data packet in a grant-based mode from a second UL resource allocated to the wireless communication device.

The apparatus further includes wherein the first configuration message further indicates that the grant-free mode is allowed when a rule is satisfied, and wherein the rule is associated with at least one of a path loss, a packet size, a delay constraint, or a quality of service (QoS) requirement. The apparatus further includes means for receiving, from the wireless communication device, a request message requesting UL transmission in the grant-based mode when the grant-free mode is allowed. The apparatus further includes means for sending a UL grant indicating the second UL resource allocated to the wireless communication device. The apparatus further includes means for sending a second configuration message indicating that the grant-free mode is disallowed when determining that the grant-free mode is disallowed. The apparatus further includes wherein the means for determining whether to allow the grant-free mode is further configured to determine that the grant-free mode is disallowed when a loading of the network is above a threshold. The apparatus further includes wherein the means for determining whether to allow the grant-free mode further configured to determine that the grant-free mode is allowed when a loading of the network is below a threshold. The apparatus further includes means for receiving, from the wireless communication device, a request message requesting for the grant-free mode, wherein the first configuration message is sent in response to the request message. The apparatus further includes wherein the first configuration message further indicates a plurality of UL resources pre-configured for the grant-free mode, and wherein the first UL resource is one of the plurality of UL resources. The apparatus further includes wherein the first configuration message further indicates a plurality of signatures pre-configured for the grant-free mode, and wherein the first data packet is associated with one of the plurality of signatures.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
receiving, by a user equipment (UE), a transmission configuration indicating a threshold associated with at least one of a delay constraint or a data packet size of a transmission for selecting between a grant-free mode and a grant-based mode for the transmission;
selecting, dynamically by the UE, between the grant-free mode and the grant-based mode based on at least the threshold in the received transmission configuration;
sending, by the UE based on the selecting, a first data packet in the grant-free mode using a first uplink (UL) resource; and
sending, by the UE based on the selecting, a second data packet in the grant-based mode using a second UL resource allocated to the UE.

2. The method of claim 1, wherein the threshold is further associated with at least one of a path loss or a quality of service (QoS) requirement.

3. The method of claim 1, further comprising determining, by the UE, that the grant-free mode is allowed based on the transmission configuration, wherein the selecting further includes selecting between the grant-free mode and the grant-based mode based on a property of the first data packet or the second data packet, the property including at least one of a data packet size of the first data packet, a delay constraint of the first data packet, a data packet size of the second data packet, or a delay constraint of the second data packet.

4. The method of claim 1, further comprising:
determining, by the UE, that the grant-free mode is allowed based on the transmission configuration; and
monitoring, by the UE, for a UL grant,
wherein the selecting further includes selecting the grant-free mode when no UL grant is received.

5. The method of claim 4, further comprising receiving, by the UE, the UL grant indicating the second UL resource allocated to the UE, wherein the selecting further includes selecting the grant-based mode when the UL grant is received.

6. The method of claim 1, further comprising:
obtaining, by the UE from the transmission configuration, a plurality of UL resources allowed for the grant-free mode; and
selecting, by the UE, the first UL resource from the plurality of UL resources for sending the first data packet.

7. The method of claim 1, further comprising:
obtaining, by the UE from the transmission configuration, a plurality of signatures for the grant-free mode; and
selecting, by the UE, a first signature from the plurality of signatures,
wherein the sending the first data packet further includes sending the first data packet according to the first signature.

8. A method of wireless communication, comprising:
determining, dynamically by a first wireless communication device, whether to allow uplink (UL) data transmission in a grant-free mode in a network;
configuring, by the first wireless communication device, a first configuration message to indicate a threshold associated with at least one of a delay constraint or a data packet size of a transmission for selecting between a grant-free mode and a grant-based mode for the transmission;
sending, by the first wireless communication device, the first configuration message when determining that the grant-free mode is allowed, the first configuration message indicating the threshold associated with at least one of the delay constraint or the data packet size of the transmission for selecting between the grant-free mode and the grant-based mode for the transmission;
receiving, by the first wireless communication device from a second wireless communication device, a first data packet in the grant-free mode from a first UL resource; and
receiving, by the first wireless communication device from the second wireless communication device, a second data packet in a grant-based mode from a second UL resource allocated to the second wireless communication device.

9. The method of claim 8, wherein the threshold is further associated with at least one of a path loss or a quality of service (QoS) requirement.

10. The method of claim 8, further comprising:
sending, by the first wireless communication device, a UL grant indicating the second UL resource allocated to the second wireless communication device.

11. The method of claim 8, wherein the determining further includes determining that the grant-free mode is disallowed when a loading of the network is above a network loading threshold, and wherein the method further comprises sending, by the first wireless communication device, a second configuration message indicating that the grant-free mode is disallowed when determining that the grant-free mode is disallowed.

12. The method of claim 8, wherein the determining further includes determining that the grant-free mode is allowed when a loading of the network is below a network loading threshold.

13. The method of claim 12, wherein the configuring further includes configuring, by the first wireless communication device, the first configuration message to indicate a plurality of UL resources pre-configured for the grant-free mode, wherein the first UL resource is one of the plurality of UL resources.

14. The method of claim 12, wherein the configuring further includes configuring, by the first wireless communication device, the first configuration message to indicate a plurality of signatures pre-configured for the grant-free mode, wherein the first data packet is associated with one of the plurality of signatures.

15. A wireless communication device, comprising:
a receiver configured to receive a transmission configuration indicating a threshold associated with at least one of a delay constraint or a data packet size of a transmission for selecting between a grant-free mode and a grant-based mode for the transmission;
a processor configured to dynamically select a transmission mode between the grant-free mode and the grant-based mode based on at least the threshold in the received transmission configuration; and
a transmitter configured to:
send, based on the selecting, a first data packet in the grant-free mode using a first uplink (UL) resource; and
send, based on the selecting, a second data packet in the grant-based mode using a second UL resource allocated to the wireless communication device.

16. The wireless communication device of claim 15, wherein the threshold is further associated with at least one of a path loss or a quality of service (QoS) requirement.

17. The wireless communication device of claim 15, wherein the transmission configuration indicates that the grant-free mode is allowed, and wherein the processor is further configured to select between the grant-free mode and the grant-based mode by selecting between the grant-free mode and the grant-based mode based on a property of the first data packet or the second data packet, the property including at least one of a data packet size of the first data packet, a delay constraint of the first data packet, a data packet size of the second data packet, or a delay constraint of the second data packet.

18. The wireless communication device of claim 15, wherein the transmission configuration indicates that the grant-free mode is allowed, and wherein the processor is further configured to:
   monitor for a UL grant; and
   select between the grant-free mode and the grant-based mode by selecting the grant-free mode when no UL grant is received.

19. The wireless communication device of claim 18, wherein the receiver is further configured to receive the UL grant indicating the second UL resource allocated to the UE, wherein the processor is further configured to select between the grant-free mode and the grant-based mode by selecting the grant-based mode when the UL grant is received.

20. The wireless communication device of claim 15, wherein the transmission configuration further indicates a plurality of UL resources allowed for the grant-free mode, and wherein the processor is further configured to select the first UL resource from the plurality of UL resources for sending the first data packet.

21. The wireless communication device of claim 15, wherein the transmission configuration further indicates a plurality of signatures for the grant-free mode, wherein the processor is further configured to select a first signature from the plurality of signatures, and wherein the first data packet is transmitted according to the first signature.

22. An apparatus comprising:
   a processor configured to:
      dynamically determine whether to allow uplink (UL) data transmission in a grant-free mode in a network; and
      configure a first configuration message to indicate a threshold associated with at least one of a delay constraint or a data packet size of a transmission for selecting between a grant-free mode and a grant-based mode for the transmission;
   a transmitter configured to send the first configuration message when determining that the grant-free mode is allowed, the first configuration message indicating the threshold associated with at least one of the delay constraint or the data packet size of the transmission for selecting between the grant-free mode and the grant-based mode for the transmission; and
   a receiver configured to:
      receive, from a wireless communication device, a first data packet in the grant-free mode from a first UL resource; and
      receive, from the wireless communication device, a second data packet in a grant-based mode from a second UL resource allocated to the wireless communication device.

23. The apparatus of claim 22, wherein the threshold is further associated with at least one of a path loss or a quality of service (QoS) requirement.

24. The apparatus of claim 22, wherein the transmitter is further configured to send a UL grant indicating the second UL resource allocated to the wireless communication device.

25. The apparatus of claim 22, wherein the processor is further configured to determine whether to allow the grant-free mode by determining that the grant-free mode is disallowed when a loading of the network is above a network loading threshold, and wherein the transmitter is further configured to send a second configuration message indicating that the grant-free mode is disallowed when determining that the grant-free mode is disallowed.

26. The apparatus of claim 22, wherein the processor is further configured to determine whether to allow the grant-free mode by determining that the grant-free mode is allowed when a loading of the network is below a network loading threshold.

27. The apparatus of claim 22, wherein the first configuration message further indicates a plurality of UL resources pre-configured for the grant-free mode, and wherein the first UL resource is one of the plurality of UL resources.

28. The apparatus of claim 22, wherein the first configuration message further indicates a plurality of signatures pre-configured for the grant-free mode, and wherein the first data packet is associated with one of the plurality of signatures.

29. The method of claim 1, wherein the selecting further includes determining, by the UE, that at least one of a data packet size or a delay constraint of the first data packet satisfies the threshold prior to sending the first data packet in the grant-free mode.

30. The wireless communication device of claim 15, wherein the processor is further configured to select between the grant-free mode and the grant-based mode by determining that at least one of a data packet size or a delay constraint of the first data packet satisfies the threshold prior to sending the first data packet in the grant-free mode.

* * * * *